United States Patent [19]
Yung et al.

[11] Patent Number: 5,546,554
[45] Date of Patent: Aug. 13, 1996

[54] APPARATUS FOR DYNAMIC REGISTER MANAGEMENT IN A FLOATING POINT UNIT

[75] Inventors: Robert Yung, Fremont; Greg Williams; Huoy-Ming Yeh, both of Palo Alto, all of Calif.

[73] Assignee: Sun Microsystems, Inc., Mountain View, Calif.

[21] Appl. No.: 190,872

[22] Filed: Feb. 2, 1994

[51] Int. Cl.$^6$ .................................................. G06F 12/00
[52] U.S. Cl. ........................................... 395/413; 395/375
[58] Field of Search ................................. 395/200, 400, 395/425, 412, 375

[56] References Cited

U.S. PATENT DOCUMENTS 5,226,126  7/1993  McFarland et al. ................. 395/375

OTHER PUBLICATIONS

G. F. Grohoski, "Machine Organization of the IBM RISC Systems/6000 Processor", *IBM Journal of Research and Development*, vol. 34, No. 1, Jan. 1990, pp. 37–58.

R. M. Tomasulo, "An Efficient Algorithm for Exploiting Multiple Arithmetic Units", *IBM Journal of Research and Development*, vol. 11, No. 1, Jan. 1967, pp. 25–33.

D. W. Anderson et al., "The IBM System/360 Model 91: Machine Philosophy and Instruction–Handling", *IBM Journal of Research and Development*, vol. 11, No. 1. Jan. 1967, pp. 8–24.

James E. Thornton, "Parallel Operation in the Control data 6600", AFIPS Conference Proceedings, vol. 26, Part II, 1964, pp. 33–40.

Mike Johnson, "Superscalar Microprocessor Design", 1991, Prentice Hall, Englewood Cliffs, New Jersey, Chapters 6–7, pp. 103–146.

W. W. Hwu et al., "Exploiting Horizontal and Vertical Concurrency via the HPSm Microprocessor", *Proceedings of the 20th Annual Workshop on Microprogramming*, Dec. 1987, pp. 154–161.

*Primary Examiner*—Jack A. Lane
*Assistant Examiner*—Fadi A. Stephan
*Attorney, Agent, or Firm*—Blakely Sokoloff Taylor & Zafman

[57] ABSTRACT

In a processor, an instruction unit that issues a plurality of instructions is coupled to a mapping unit. Each instruction contains at least one "virtual" address corresponding to a user-addressable register as defined by an instruction set architecture. A register file having a number of physical register addresses in excess of the user addressable virtual register address is also coupled to the mapping unit. The mapping unit receives instructions from the instruction unit and generates a map value for each virtual register address. The mapping unit also maintains a status value for each physical register address. Maintaining the status value provides for out-of-order completion and in-order retirement. A new mapping is generated each time a virtual register address is used as a destination register address of an instruction. This insures that no physical register address will be overwritten before all older instructions have been resolved. This, in turn, provides for precise exception handling, which is accomplished by unwinding the instruction sequence from the youngest to the oldest instruction up to the point where the exception occurred.

25 Claims, 19 Drawing Sheets

| MAPPING V | P | READY | + FREE | = STATUS |
|---|---|---|---|---|
| $V_0$ | $P_0$ | 1 | 0 | READY |
| $V_1$ | $P_1$ | 1 | 0 | READY |
| $V_2$ | $P_2$ | 1 | 0 | READY |
| $V_3$ | $P_3$ | 1 | 0 | READY |
| $V_4$ | $P_4$ | 1 | 0 | READY |
| $V_5$ | $P_5$ | 1 | 0 | READY |
| ⋮ | ⋮ | | | |
| $V_{15}$ | $P_{15}$ | 1 | 0 | READY |
| | $P_{16}$ | 0 | 0 | WAITING |
| | $P_{17}$ | 0 | 0 | WAITING |
| | $P_{18}$ | 0 | 0 | WAITING |
| | $P_{19}$ | 0 | 0 | WAITING |
| | ⋮ | | | |
| | $P_{p-1}$ | 0 | 1 | FREE |

APPARATUS FOR DYNAMIC REGISTER MANAGEMENT IN A FLOATING POINT UNIT

BACKGROUND OF THE INVENTION

1. Field of the Invention

The method and apparatus of the present invention relate to dynamic floating point register management techniques in a superscalar computer system. More particularly the method and apparatus of the present invention relates to reducing processing stalls due to hardware limitations.

2. Art Background

The quest for speed and efficiency of processing in computing systems has led to two architectures that allow faster processing speed by implementing simultaneous execution of multiple instructions: pipelined architectures and superscalar architectures.

When first introduced, microprocessors typically included a central processing unit (CPU) that executed only one instruction at a time. Pipelined architectures were developed based on the observation that any given instruction consists of a given number of execution steps. By breaking the execution of instructions into a number of stages, each stage corresponding to an execution step, instruction throughput is increased because a new instruction is allowed to begin execution before a previous instruction has completed. Therefore, throughput becomes a function of how long it takes to complete a single execution step. Optimally, each stage completes execution in one clock period of the system clock.

Practitioners in the art have found that even greater speed and efficiency can be achieved through the use of super-pipelining. In superpipelining, each pipeline is broken down into smaller stages than previously allowed for in a typical pipelining implementation. This type of architecture is also known as extended pipelining. Having a greater number of pipeline stages allows for a corresponding increase in the number of instructions that may be processed in the pipeline at any given time.

By contrast, superscalar architectures provide for multiple instruction launch into multiple instruction execution units. Thus, unlike the earliest processors, superscalar processors allow for parallel instruction execution in two or more instruction execution units. The number of instructions that may be processed is increased with the number of parallel instruction execution units that are implemented in the architecture. Furthermore, it is typical that superscalar architectures employ some form of pipelining to maximize instruction throughput.

Superscalar and superpipelining techniques may be implemented in the same architecture. This combination of superscalarity and superpipelining results in an additional increase in instruction parallelism and instruction throughput.

The design of floating point processing units (FPU) in computer systems having high instruction parallelism is relatively straightforward. The desire for high throughput and low latency is satisfied through careful design of the FPU and the critical data paths. However, there are a number of limitations that occur due to the complexity introduced by the combination of superscalar and superpipelined techniques within a floating point architecture.

First, the relative complexity of different floating point operations results in pipelines of different lengths. Because multiple instruction launch allows instructions that are ordered sequentially in the program order to be executed simultaneously, there is the chance that an instruction of low complexity that occurs later in the program order will complete before a more complex instruction that is positioned earlier in the program order completes. This is called "out-of-order completion". If the instruction that has completed out-of-order is also allowed to alter the state of the machine before the more complex instruction completes, "out-of-order retirement" occurs. Out-of-order retirement is contrary to maintaining the appearance of sequential operation. In order to reflect the sequential ordering of instructions in the program order, when an instruction is referred to herein, it will be related to its position in the program order through the use of two terms. For example, an "older instruction" is an instruction that is positioned earlier in the program order than the current instruction. Similarly, A "younger instruction" is an instruction that is positioned later in the program order than the current instruction. In order to further clarify the sequential nature of the program order, the program order will be referred to as the "instruction sequence".

The problem of differing pipeline lengths leads to the question of how to handle instructions that generate exceptions. Generally, floating point exceptions may be handled in either a precise or imprecise manner. Precise exception handling allows the programmer to know exactly where the error has occurred, and further allows the programmer to correct the error and continue processing without having to abort the program because the appearance of sequential execution of instructions is preserved. Imprecise exception handling, on the other hand, provides only a minimum of information to the programmer, none of which is guaranteed to be correct. This may require aborting the program. Thus, in some applications, precise exception handling is preferred.

Exception handling in the context of uneven pipeline lengths may be explored in reference to the following instruction sequence:

(1) fpdiv $f_2$, $f_1$, $f_7$ (2) fpstore $f_7$ (3) fpadd $f_0$, $f_1$, $f_2$ (4) fpadd $f_3$, $f_2$, $f_4$ (5) fpadd $f_2$, $f_5$, $f_6$ Line 1 represents a floating point divide operation having $f_2$ and $f_1$ as operands and $f_7$ as the destination of the result. The next instruction in the sequence is a floating point store operation where the contents of $f_7$ will be stored to main memory. Typically, the execution of a floating point store operation is deferred until a time when there are no outstanding older instructions. Alternatively, the floating point store operation may be executed such that the contents of the referenced register are read, but the act of storing the result to memory is deferred until there are no older outstanding instructions. Thus, realistically, in a superscalar processor the floating point divide instruction of line 1 and the floating point add of line 3 are likely to be executed simultaneously. It should be noted that the divide operation is much more complex than the add operation and requires more clock periods to complete. Therefore a longer execution pipeline is required for the divide operation. For purposes of illustration, the divide pipeline has four stages and the add pipeline is a single stage pipeline.

In an architecture that does not address the different pipeline lengths, the add operations of lines 3, 4 and 5 will complete and change the state of the machine before the divide operation is completed. If an exception is generated in the divide operation after the third instruction has altered the state of $f_2$, the program may have to be aborted because the state of the machine prior to the exception is no longer known. Thus, uneven pipeline length can result in imprecise exception handling.

One prior art method that provides for precise exception handling is known as even-length pipelining. In order to prevent out-of-order retirement of instructions, delay elements, each being equal to one pipeline stage, are added to the shorter pipeline in order to make the total pipeline length of all pipelines equal to that of the longest pipeline in the system. After completion of an instruction, a temporary result is propagated through each delay stage. If an older instruction generates an exception, the temporary result is discarded and the state of the machine is unchanged. If the older instruction completes successfully, the younger instruction is allowed to retire and the now final result is written to the file.

However, even-length pipelining artificially increases the latency in the system, resulting in a decrease of instruction throughput. For example, the instructions of lines 4 and 5 must wait until the fpdiv instruction of line 1 has completed before the result from instruction line 3 can be used. Thus, instructions that could be in the pipeline must wait outside the pipeline until the artificial latency introduced by the even length pipelining is resolved. It can therefore be seen that, although preventing out-of-order retirement of instructions is important to providing precise exception handling, out-of-order completion is also desirable in order to increase instruction throughput.

Another prior art method is known that allows for both precise exception handling and the pipelining of pending instructions. It should be noted that in the first prior art method the result of instruction 3 will be known several stages before it is written to the register file. In an alternate method a superscalar superpipelined design will capitalize on this fact by providing a selector circuit at the beginning of each execution pipeline. The result of every stage of every execution pipeline is latched in a temporary result register and fed into the selection logic. The selection logic is then used to select between the output ports of the register file and the result of every execution stage of every pipeline. This permits an instruction that depends upon the result of an older instruction to be launched into an execution pipeline as soon as the temporary result of the older instruction is found. Therefore, launching of the younger instruction does not need to be delayed until the final result of the older instruction has been written to the register file, resulting in increased throughput.

There are several problems associated with the introduction of temporary result registers into the pipelines of the superscalar processor. As the number of pipelines and the number of stages per pipeline is increased, so too must the number of inputs to the selector circuits at the beginning of each execution pipeline increase. This increase in complexity results in wasted area on an integrated circuit chip. Additionally, because the temporary registers and selection logic are on the critical data path of the pipeline, the pipeline length is increased, resulting in increased latency.

Another limitation with respect to superscalar superpipelined floating point architectures is that the instruction parallelism of a system may be underutilized if there are an insufficient number of floating point registers. This is because an artificial dependency is produced when two instructions use the same destination register. For example, in the above instruction sequence, the second instruction must wait until the first instruction and all instructions that depend on the result of the first instruction are resolved before it may overwrite the destination register. In typical prior art systems, such as the Sun Microsystems SPARC™ architecture, used by Sun Microsystems, Inc., Mountain View, Calif., the maximum number of available floating point registers is defined in the instruction set architecture. For example, the Sun Microsystems SPARC™ instruction set provides sixteen double-precision floating point registers which are physically implemented in a register file. Although this problem is somewhat alleviated by the superpipeline structure, which allows for the simultaneous use of registers within the pipeline, the number of user addressable floating point registers remains a practical limitation in implementation.

SUMMARY OF THE INVENTION

Methods and apparatus for dynamic register management in a processor that executes a sequence of instructions are disclosed. A plurality of virtual register addresses is provided. These virtual register addresses correspond to user addressable registers as defined by an instruction set architecture. In addition, a plurality of physical register addresses is provided. These physical register addresses correspond to physical registers contained within the register file of the processor. In the illustrative embodiment, the number of physical register addresses outnumber the number of virtual register addresses.

A map between the virtual register addresses and the physical register addresses is provided. A new mapping is generated for a virtual register address whenever an instruction using the virtual register address as its destination register address is issued. The sequence of instructions are executed such that instructions occurring later in the sequence are allowed to complete before instructions occurring earlier in the sequence complete. When an instruction successfully completes, a result is generated. This result is stored at the physical register address indicated by the map.

If a first instruction having a first virtual register as its virtual destination register produces an exception, the instruction sequence is unwound to reset the map to a previous mapping for the first virtual register which corresponds to the last mapping for the first virtual register prior to the instruction that produced the exception. The process of resetting to the last valid mapping takes the form of unwinding the instruction stream from the youngest instruction to the oldest instruction using the mapping generated by the next oldest instruction. This unwinding process may be done sequentially or concurrently. Because registers are not allowed to be overwritten, precise exception handling is provided.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

The present invention discloses apparatus and methods having particular application in a processor utilizing a superscalar and superpipelined architecture. In particular, the present invention discloses apparatus and methods for dynamic floating point register management that provide for out-of-order completion, in-order retirement, and precise exception handling. Although the present invention is described with reference to specific circuits, block diagrams, signals, algorithms, etc., it will be appreciated by one of ordinary skill in the art that such details are disclosed simply to provide a more thorough understanding of the present invention. It will therefore be apparent to one skilled in the art that the present invention may be practiced without the specific details. In other instances, well known circuits are shown in block diagram form in order not to obscure the present invention unnecessarily.

Figure 1:
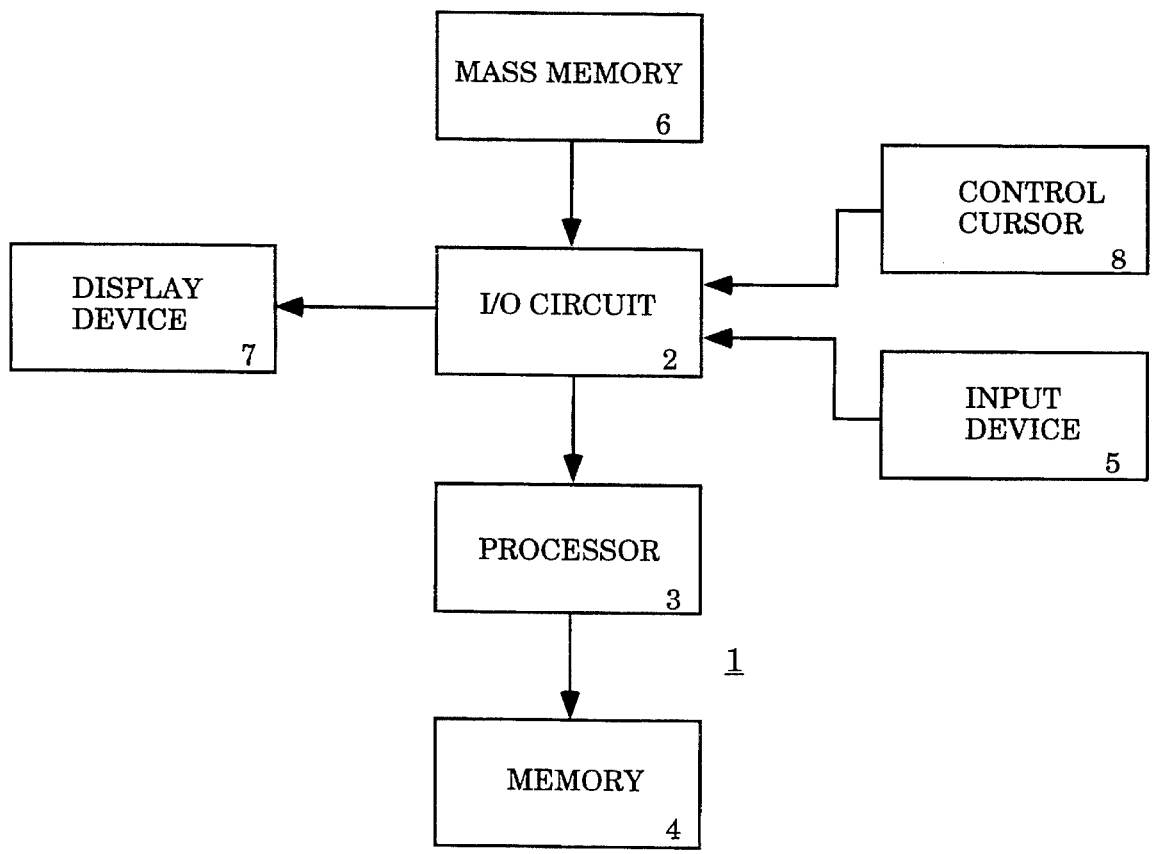
FIG. 1 depicts the illustrative computer system employed in the system of the present invention.

FIG. 1 shows a typical computer-based system for dynamic register management according to the present invention. Shown there is a computer 1 which comprises three major components. The first of these is the input/output (I/O) circuit 2 which is used to communicate information in appropriately structured form to and from the other parts of the computer 1. Also shown as a part of computer 1 is a processor that operates as described below, and memory 4. Particular examples of suitable data processors to fill the role of computer 1 include machines manufactured by Sun Microsystems, Inc., Mountain View, Calif. Other computers having like capabilities may of course be adapted in a straightforward manner to perform the functions described below.

Also shown in FIG. 1 is an input device 5, which is typically a keyboard. It should be understood, however, that the input device may actually be a card reader, magnetic or paper tape reader, or other well-known input device (including, of course, another computer). A mass memory device 6 is coupled to the I/O circuit 2 and provides additional storage capability for the computer 1. The mass memory may include other programs and the like and may take the form of a magnetic or paper tape reader or other well known device. It will be appreciated that the data retained within mass memory 6, may, in appropriate cases, be incorporated in standard fashion into computer 1 as part of memory 4.

In addition, a display device 7 is illustrated which is used to display messages or other communications to the user. Such a display device may take the form of any of several well-known varieties of CRT displays. A cursor control 8 is used to select command modes and provides a more convenient means to input information into the system.

Figure 2:
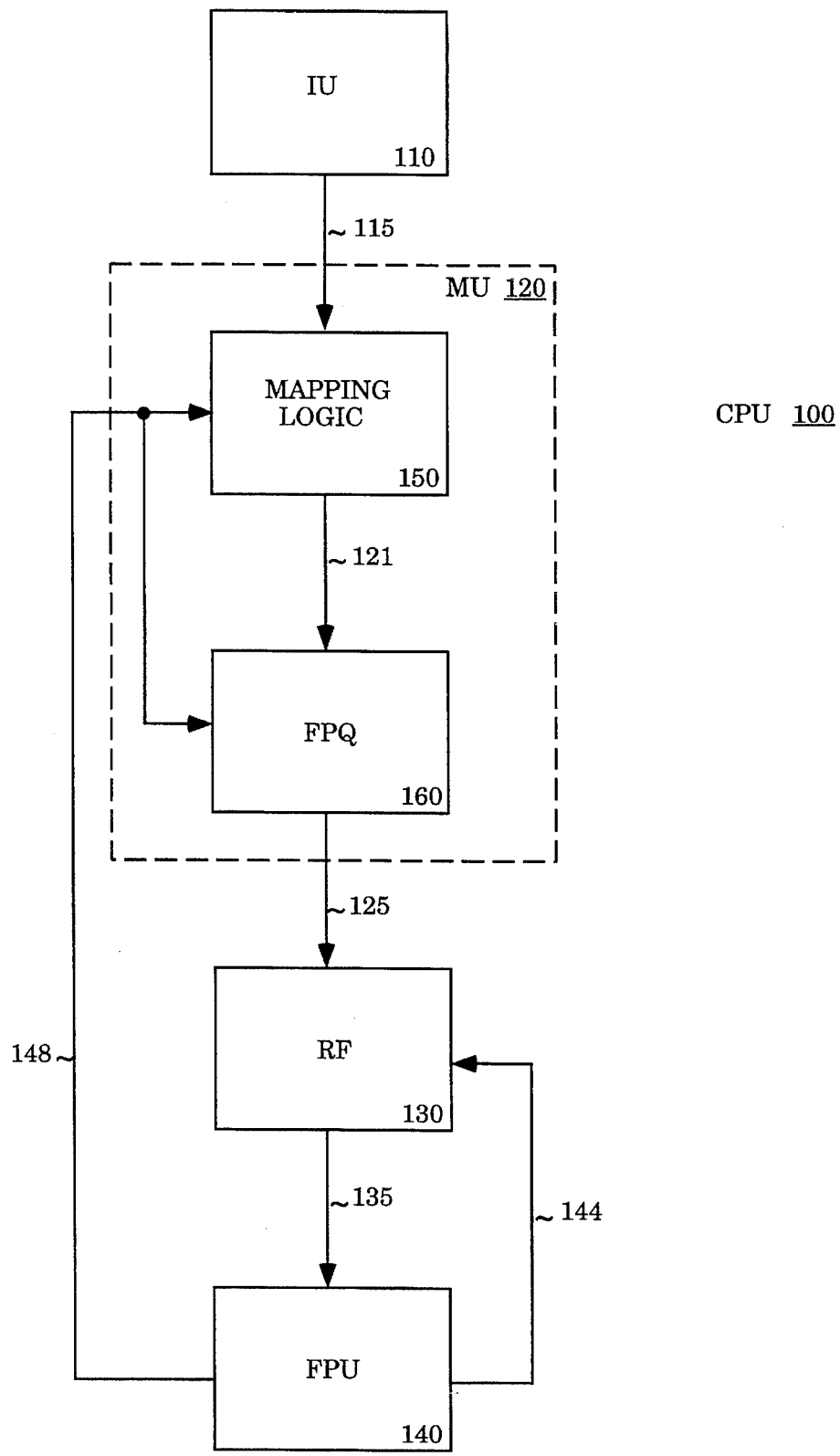
FIG. 2 is an exemplary block diagram of the system of the present invention illustrating the functional units contained within a mapping unit.

FIG. 2 illustrates a simplified block diagram of a processor which operates in accordance with the teachings of the present invention. Referring to FIG. 2, a central processing unit (CPU) 100 is illustrated. Within the CPU there is an instruction dispatch unit (IU) 110, a mapping unit (MU) 120, which includes mapping logic 150 and, if one is defined, a floating point queue (FPQ) 160, a register file (RF) 130, and a floating point instruction execution unit (FPU) 140. It should be noted that the present invention is not limited to the use of an FPU. Any instruction execution unit known in the art, such as an integer instruction execution unit or equivalent, can be used in conjunction with the teachings of the present disclosure.

The IU 110 is capable of issuing a number of floating point instructions, including floating point arithmetic instructions, such as floating point add (fpadd), floating point subtract (fpsub), floating point multiply (fpmul) and floating point divide (fpdiv). Further, the IU 110 may issue floating point memory instructions, such as floating point store (fpstore) and floating point load (fpload).

For all practical purposes, each floating point arithmetic instruction comprises the necessary opcode to perform a floating point arithmetic operation and the source and destination floating point register addresses. The source address or addresses identify the register or registers from which the data comprising the operands for the floating point operation will be retrieved. The destination register address indicates the register to which the floating point result will be written after the FPU 140 has completed the instruction.

By contrast, floating point memory instructions are much simpler, containing the requisite opcode, one or more integer register addresses for memory address computation, and a single floating point register address corresponding to the register where data will be read from or stored into. Floating point memory operations include store (fpstore), in which the contents of the floating point register are stored in memory, and load (fpload), in which the floating point register is loaded with a value from memory.

The teachings of the present disclosure are not limited to 1Us that issue floating point instructions. For example, if an integer instruction execution unit is substituted for the FPU, the IU would correspondingly be capable of issuing integer instructions. Thus, the nature of the instructions that the IU issues correlates to the nature of the instructions that the instruction execution unit executes.

In the system of the present invention, the address information contained in the instruction is "virtual" address information defined by the instruction set used by the system. Virtual register addresses correspond to user addressable or "virtual" registers. The number of virtual registers is defined by the instruction set architecture implemented by a system. For example, if the Sun Microsystems SPARC™ V8 instruction set is implemented, there are thirty two single-precision floating point registers that are user-addressable. Thus, a programmer could use registers $f_0$ to $f_{31}$ for floating point operations. It should be noted that the SPARC™ V8 instruction set architecture further provides for aliasing the thirty two single-precision $f_0$ to $f_{31}$ floating point registers as sixteen double-precision floating point registers $f_0$ to $f_{30}$. Where single-precision registers are 32 bits wide, double-precision registers are 64 bits wide, comprising two contiguous even/odd pairs of single-precision register addresses. Thus, double-precision floating point register $f_0$ comprises single-precision floating point registers $f_0$ to $f_1$. Double-precision register addresses thus range from $f_0$ to $f_{30}$ in the sequence $f_0$, $f_2$, $f_4$ . . . $f_{28}$, and $f_{30}$. Implementing aliasing in the instruction set architecture does not act to limit the operation of the present invention, as it may be easily reflected in the mapping logic. Therefore, the remainder of this disclosure will reference an exemplary instruction set architecture having sixteen single-precision floating point registers $v_0$ to $v_{15}$.

The illustrative embodiment of the present invention employs a register file 130 containing physical registers each having physical register addresses, wherein the number of physical register addresses exceeds the number of virtual register addresses, and there is no set correspondence between the virtual register set and the physical register address set. The mapping unit 120 is responsible for mapping each virtual register address to a physical register address. In the system of the present invention, if the same identified virtual register address is the destination register address of different outstanding instructions, the mapping unit 120 will map a different physical register address to the same virtual register address for each use. The number of new mappings is limited by the number of outstanding instructions and the number of available unassigned physical register addresses. As will be shown, the mapping unit 120 maps registers dynamically, assigning new map values or reassigning previous map values depending on the status of outstanding instructions and previous mappings.

For a floating point arithmetic instruction, the IU 110 sends an instruction signal via signal path 115 to the mapping unit 120. The mapping unit maps the virtual register addresses to physical register addresses that each indicate a physical register contained within the register file 130. For a virtual source register address, the mapping unit 120 simply references the current mapping for the virtual register address indicated by the instruction. For the virtual destination register address, the mapping unit generates a new mapping for the indicated virtual register address so that the physical register currently mapped to the virtual register will not be overwritten by the result of the instruction. The mapping unit outputs a mapped instruction signal comprising physical source and destination address information via the signal path 125 to the register file 130. The register file 130 accepts the first physical register address and the second physical register address and retrieves data from the corresponding physical register addresses in the register file. The register file 130 outputs an executable instruction signal containing the destination physical register address, the first source data value, and the second source data value. The register file sends that instruction signal via signal path 135 to the FPU 140. The FPU 140 processes the executable instruction signal and outputs a result signal via signal path 144 to the register file 130. The result signal comprises a result data value and the destination physical register address. The register file then places the result data value in the physical register address corresponding to the destination physical register address.

A floating point memory instruction proceeds in a similar manner. A floating point memory instruction is issued by IU 110. The floating point memory instruction includes one or more integer register address for memory address computation to form a virtual register address. If the instruction is fpstore, the map is referenced to determine the physical register whose contents are to be stored to memory. If the instruction is fpload, mapping logic 140 generates a new mapping for the indicated virtual register address so that the physical register currently mapped to the virtual register address will not be overwritten by the fpload instruction. The instruction is then loaded into FPQ 160 where outstanding FP instructions are recorded.

In the presently preferred embodiment, fpload instructions are allowed to be executed immediately while fpstore instructions are held in the FPQ 160 until there are no older outstanding instructions. Because fpstore instructions alter the contents of memory, deferring execution is necessary to prevent altering the state of the machine. However, it will be obvious to one skilled in the art that delaying execution of the fpstore instruction is not the only manner in which out-of-order retirement of fpstore instructions may be prevented. One alternative is the use of a buffer memory to temporarily store the results of fpstore instructions where the buffer memory forwards the results to main memory only after all older instructions have completed.

It should be noted for the purposes of discussion, that the FPU 140 has been extremely simplified. In the system of this example the FPU 140 is actually a superscalar superpipelined structure having multiple instruction execution paths, each instruction path being superpipelined. It should also be noted that Register File 130 is not necessarily a separate functional unit within the microprocessor 100. For example, the register file is contained in the FPU in the preferred embodiment of the present invention.

The operation of the mapping unit 120 will now be discussed in greater detail. Mapping logic 150 receives the instruction signal from the IU 110 and maps the virtual register address into physical register address. When a system is initialized the mapping logic will provide an initial mapping between virtual and physical register addresses. After the virtual register address information of an instruction has been mapped, the mapping logic 150 will forward the mapped instruction signal to the FPQ 160 via signal path 121. Included in this mapped instruction signal is a status value that allows the mapping logic to reclaim mapped registers after the last instruction requiring use of a mapped register is retired.

FPQ 160 then forwards the mapped instruction signal to the register file 130 via signal path 125, and processing then continues as discussed above. When processing is completed at the FPU 140, a completion signal is sent from FPU 140 to mapping unit 120 via signal path 148. This completion signal causes the status value of the destination register to be changed. If there are no older outstanding instructions, the status of the previous destination register address, if one exists, will also be changed. The process of changing the status value of physical register addresses is described further below.

The process performed by mapping unit 120 will now be described with reference to the flow diagram of FIG. 3. The mapping unit capitalizes on the fact that the number of registers in the physical register address set exceeds the number of registers in the virtual register set. For the purposes of illustration, assume the number of physical register addresses, P, exceeds the number of virtual register addresses, V, by some number, n.

Figure 3:
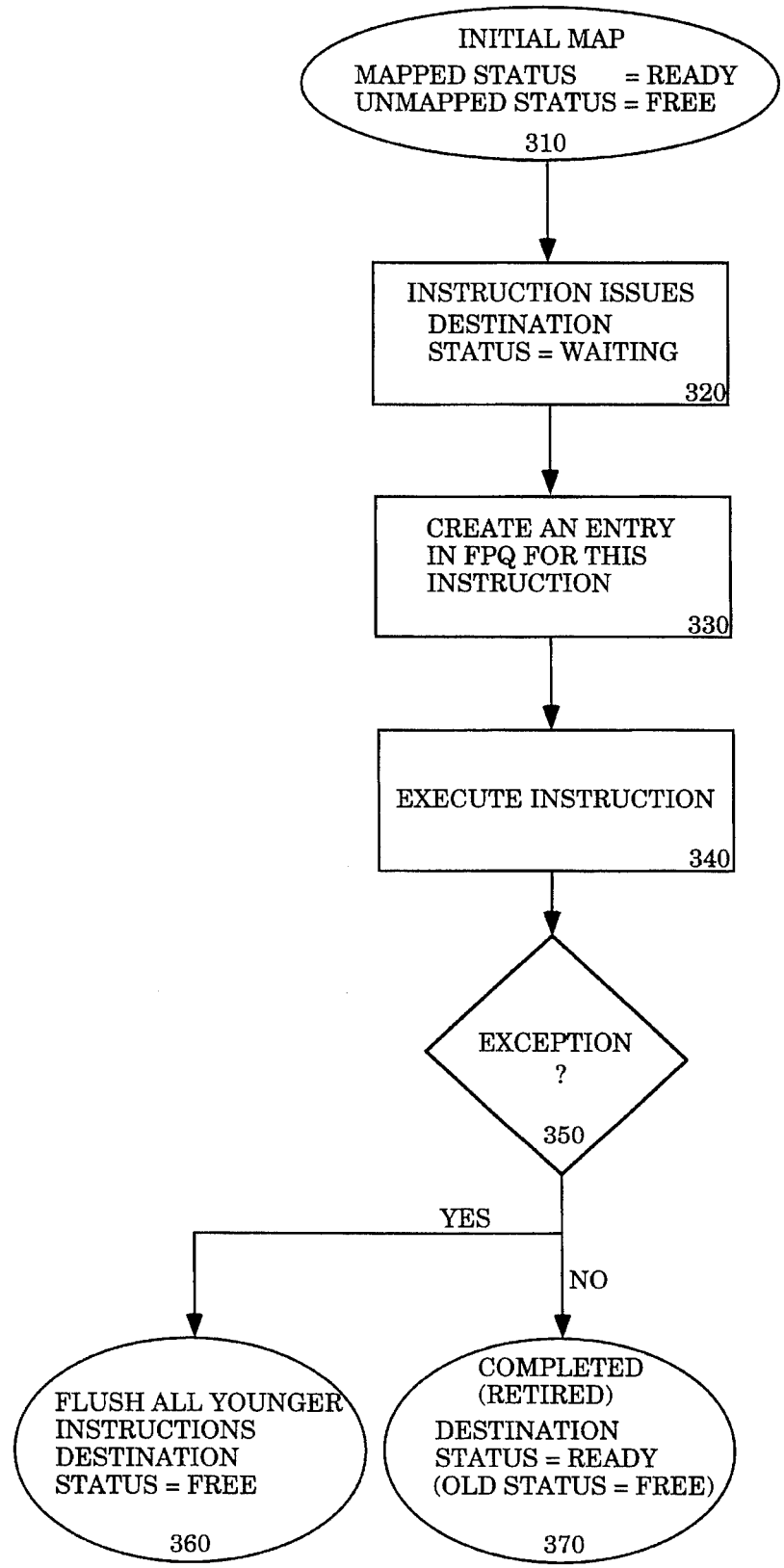
FIG. 3 is a flow diagram illustrative of the preferred embodiment of the method for register management in the present invention.

Referring now to FIG. 3, when the CPU is initialized, the mapping logic will assign an initial map value to each of the virtual register addresses at step 310. This can result in an initial direct correspondence between virtual and physical register address addresses, i.e. virtual register addresses $v_0$ to $v_{15}$ will be mapped to physical register addresses $p_0$ to $p_{15}$, respectively. In addition, a status value is generated for each physical register address. Mapped physical register addresses are assigned a "READY" status, and unmapped physical register addresses $p_{16}$ to $p_{p-1}$ are assigned a "FREE" status.

When the IU issues an instruction at step 320, for example, fpadd $v_0$, $v_1$, $v_2$, the mapping logic checks the current map and status values of the operands $v_0$ and $v_1$. As stated above, the physical register addresses $p_0$ and $p_1$ are mapped to $v_0$ and $v_1$, respectively, and they both have a READY status, which denotes that the physical register indicated by the physical register address is ready for use as a source or operand.

The mapping logic treats the destination register address $v_2$ in a different manner. In order to prevent overwriting of the initial value in $p_2$, a new mapping is generated for $v_2$. The mapping logic resets the pointer for $v_2$ from the previously mapped register address $p_2$ to a register currently having a FREE status, which denotes that the physical register is free to be used as a destination register address. For example, the new map value for $v_2$ will be $p_{16}$, which is the nearest available physical register address with a FREE status. The status value of $p_{16}$ is then changed from FREE to WAITING. The WAITING state indicates that the register is waiting for completion of the instruction and that the contents of the register are not yet available for use by younger instructions. The status value is changed again only when the instruction completes or when an exception occurs at that instruction or an older instruction. It should be noted that as an instruction sequence becomes more complex, the process of generating new map values will not necessarily take place in a sequential fashion. The order in which registers become free is not set, and the mapping logic may reuse any free register.

The mapping logic sends the mapped instruction signal to the FPQ in step 330. Included in this mapped instruction signal are the mapped addresses and the previous physical register address mapping of the destination virtual register address. For example, the above fpadd operation will contain the mapped addresses of $p_0$, $p_1$ and $p_{16}$, and will further include the address $p_2$, corresponding to the previous mapping for virtual register address $v_2$. The old destination register address is the physical register address to which the virtual register address was previously mapped. This old destination register address will be used in the unwinding process. Thus, if the next instruction in the sequence is fpdiv $v_3$, $v_4$, $v_2$, and the new mapping for $v_2$ is $p_{17}$, the mapped instruction signal for the fpdiv instruction includes $p_{16}$, the old destination register address of $v_2$.

The FPQ sends the mapped instruction to the FPU for execution in step 340. If an exception occurs in step 350, all younger instructions with respect to the excepted instruction are flushed from the FPQ from the youngest instruction to the oldest instruction in step 360. A younger instruction will be flushed from the FPQ even if it has completed. The status of each mapped destination register address for each flushed instruction is set to FREE, and the previous map values are used to unwind the instruction sequence until the machine is returned to the state prior to the execution of the excepted instruction. The manner in which the flushed instructions are unwound provides for precise exception handling. The unwinding process is discussed in more detail below.

If there is no exception, the instruction completes in step 370. The status of the destination register address is set to READY, and instructions that use the destination register as an operand may now be executed. If there are no older outstanding instructions, the instruction is retired, or removed from the FPQ, and the status of the old destination register is set to FREE.

The following is a detailed example of the process illustrated in FIG. 3. In particular, the example discussed below illustrates more fully the unwinding process of step 360.

Figures 4A, 4B:
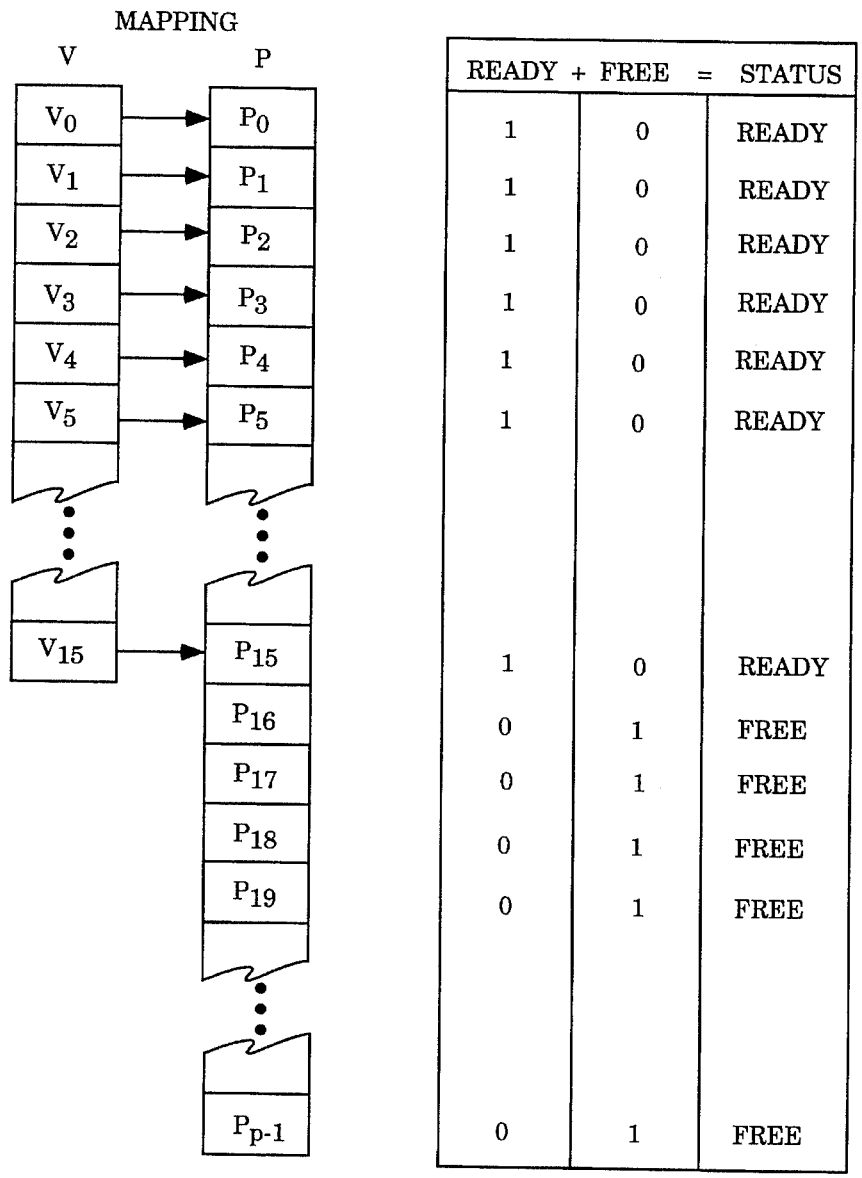
FIG. 4a illustrates the state of the map and the status of the physical register addresses prior to an instruction being issued.
FIG. 4b illustrates the state of the FPQ prior to an instruction being issued.
Figures 5A, 5B:
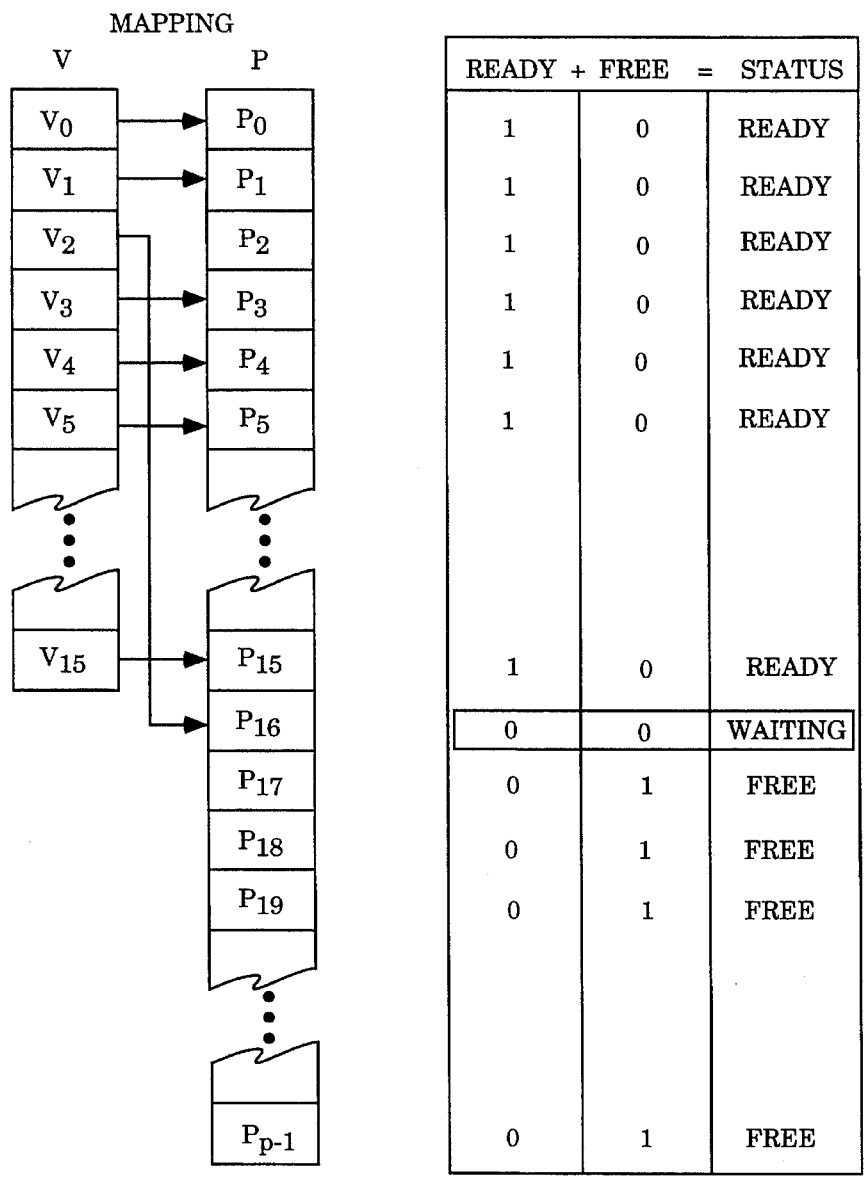
FIG. 5a illustrates the state of the map and the status of the physical register addresses when a first instruction in an instruction sequence is issued.
FIG. 5b illustrates the state of the FPQ when a first instruction in an instruction sequence is issued.

Storing the old destination register address in the FPQ allows the CPU to implement precise exception handling. If an instruction produces an exception, the mapping logic unwinds the instruction sequence to the instruction that immediately precedes the excepted instruction in the instruction sequence. Take the following instruction sequence, for example:

fpdiv $v_0, v_1, v_2$ fpadd $v_3, v_1, v_4$ fpstore $v_4$ fpmul $v_3, v_5, v_2$ fpload $v_0$ fpstor $v_2$ In this example, the values of $v_0$ to $v_{15}$ are initially mapped to correspond to the registers $p_0$ to $p_{15}$. This initial mapping can be the result of a map initializing step or the result of each virtual register being mapped once in previous instructions in the instruction stream that are not shown. However, an initial mapping is not necessary, and registers can be mapped as required. The status bit for each of the mapped registers are set to READY, while the status values of the unmapped registers $p_{16}$ to $p_{p-1}$ show a status of FREE, as illustrated in FIG. 4a. Further, the FPQ is initially empty, as illustrated in FIG. 4b. When the divide operation is mapped, a new mapping is required for the destination register $v_2$ in order to prevent overwriting the contents of $p_2$. Assuming that the mapping logic assigns FREE register $p_{16}$ as the new mapped value of $v_2$, as shown in FIG. 5a, the mapped instruction signal queued in the FPQ includes the source addresses $p_0$ and $p_1$, the new destination register address $p_{16}$, and the old destination register address $p_2$. This is illustrated in FIG. 5b. Note that the new destination register address $p_{16}$ has had the status value changed from FREE to WAITING, as shown in FIG. 5a. The status value of $p_{16}$ will not be changed until the fpdiv operation completes or until the fpdiv instruction or an older instruction produces an exception.

Figures 6A, 6B:
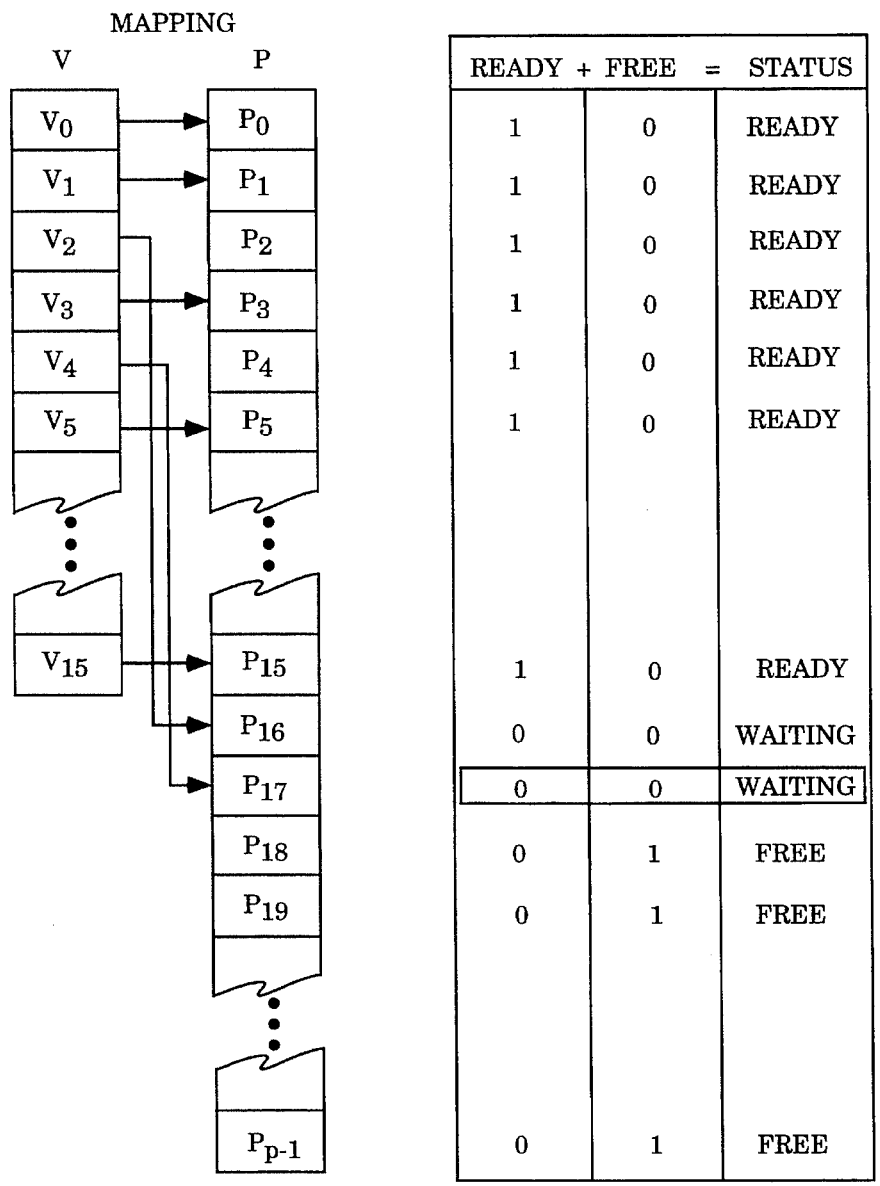
FIG. 6a illustrates the state of the map and the status of the physical register addresses when a second instruction in an instruction sequence is issued.
FIG. 6b illustrates the state of the FPQ when a second instruction in an instruction sequence is issued.

Continuing with the example, and referring to FIG. 6b, the fpadd instruction is next entered into the FPQ with new destination register address $p_{17}$ and old destination physical register address $p_4$. When $v_4$ is mapped to $p_{17}$, the status of $p_{17}$ is changed from FREE to WAITING, as shown in FIG. 6a.

Figures 7A, 7B:
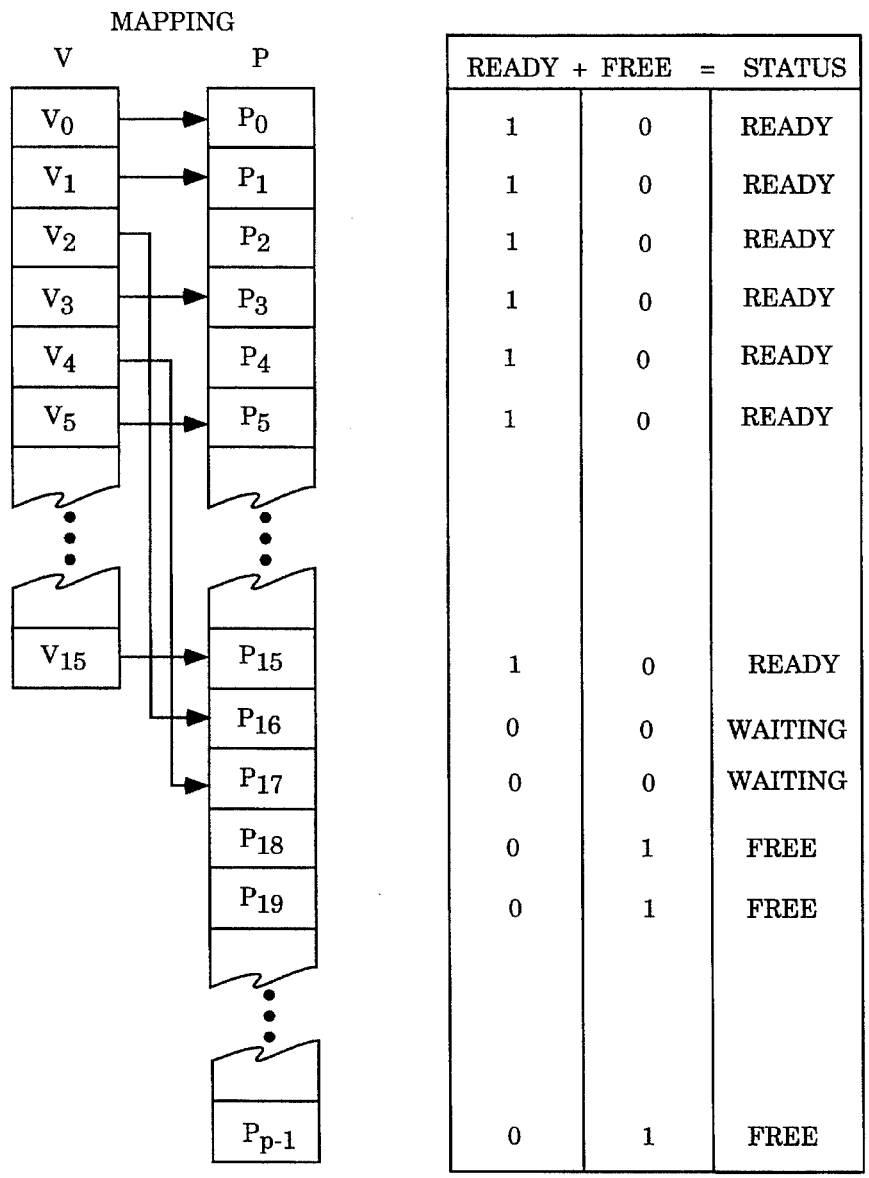
FIG. 7a illustrates the state of the map and the status of the physical register addresses when a third instruction in an instruction sequence is issued.
FIG. 7b illustrates the state of the FPQ when a third instruction in an instruction sequence is issued.

Referring now to FIGS. 7a and 7b, the first fpstore instruction is loaded into the FPQ. The fpstore instruction references the current mapping of $v_4$, which is $p_{17}$. No new pointer is generated, but the FPQ is loaded with the fpstore instruction. Execution of the first fpstore instruction in this implementation will be deferred until all older instructions have completed.

Figures 8A, 8B:
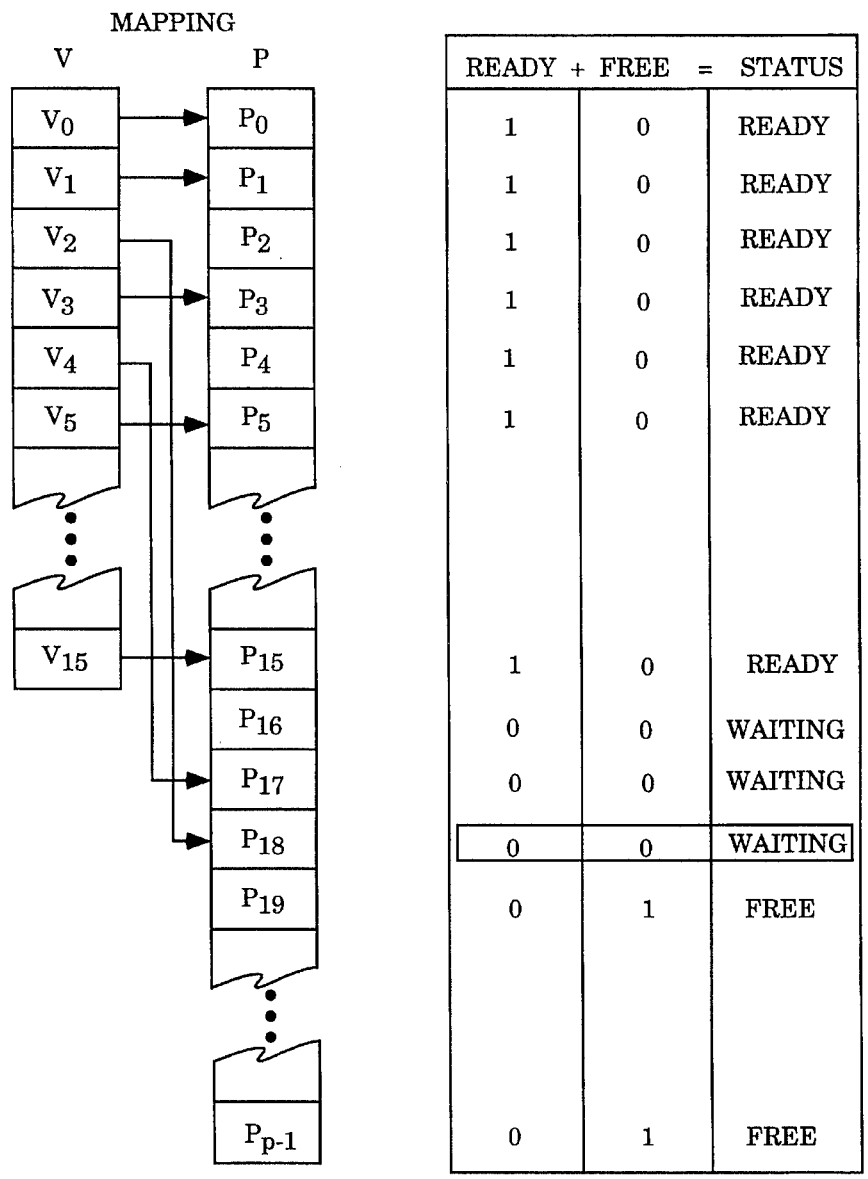
FIG. 8a illustrates the state of the map and the status of the physical register addresses when a fourth instruction in an instruction sequence is issued.
FIG. 8b illustrates the state of the FPQ when a fourth instruction in an instruction sequence is issued.

Next, the fpmul instruction causes a new mapping for virtual register address $v_2$, as illustrated in FIG. 8a. The status value of physical register address $p_{18}$ is set to WAITING, and the fpmul instruction, where the old destination register address is $p_{16}$, the map value generated by the fpadd instruction. This is illustrated in FIG. 8b.

Figures 9A, 9B:
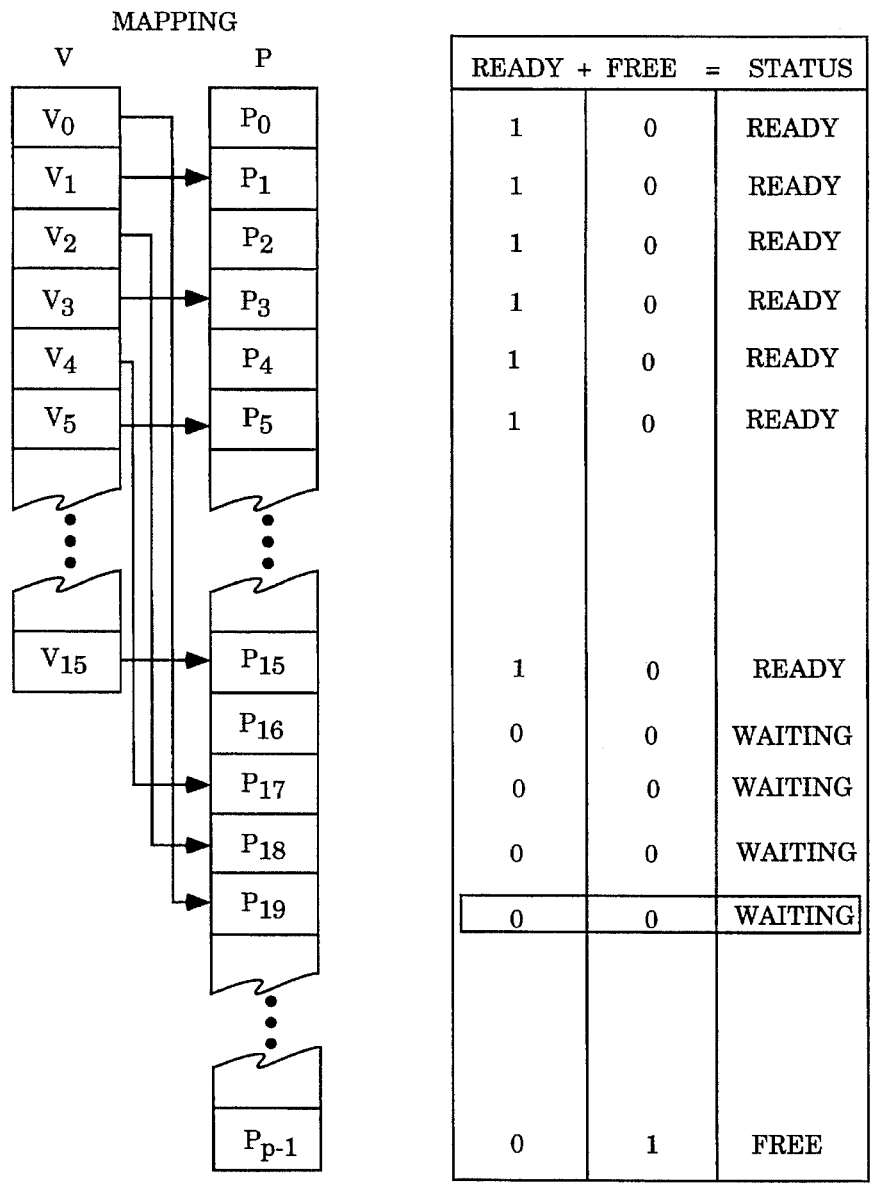
FIG. 9a illustrates the state of the map and the status of the physical register addresses when a fifth instruction in an instruction sequence is issued.
FIG. 9b illustrates the state of the FPQ when a fifth instruction in an instruction sequence is issued.

The fpload instruction is then queued for execution as illustrated by FIG. 9b, where $p_{19}$ is the new destination register address, and $p_0$ is the old destination register address. When $v_0$ is mapped to $p_{19}$, the status of $p_{19}$ is changed from FREE to WAITING, as shown in FIG. 9a.

Figures 10A, 10B:
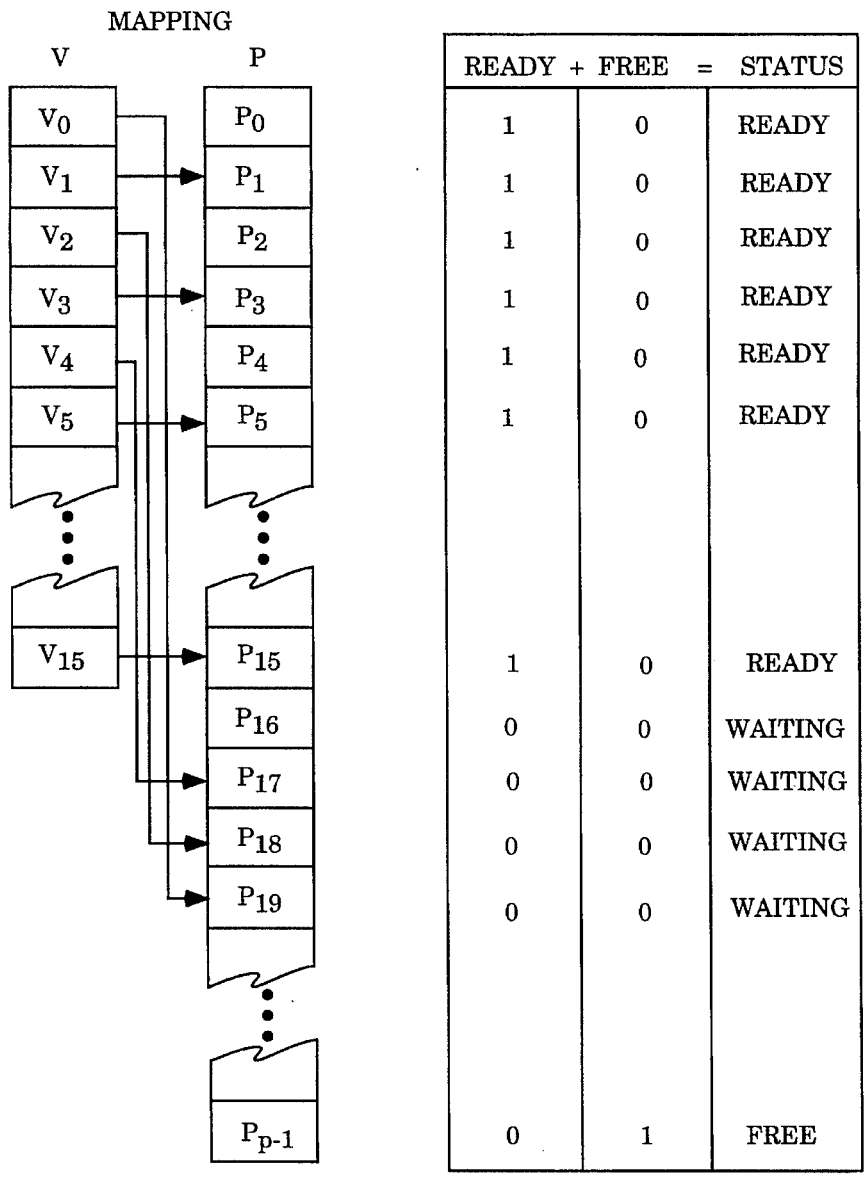
FIG. 10a illustrates the state of the map and the status of the physical register addresses when a sixth instruction in an instruction sequence is issued.
FIG. 10b illustrates the state of the FPQ when a sixth instruction in an instruction sequence is issued.

The second fpstore instruction, which uses the most recently mapped value of $v_2$ as the source address, i.e. $p_{18}$, is then queued for execution as illustrated by FIG. 10a. The second fpstore instruction results in neither a new map value nor a new status value. However, the second fpstore instruction may not be executed until $p_{18}$ has a status of READY and all older instructions are retired. The second fpstore instruction is then queued for execution in the FPQ 160, as illustrated in FIG. 10b.

Figures 11A, 11B:
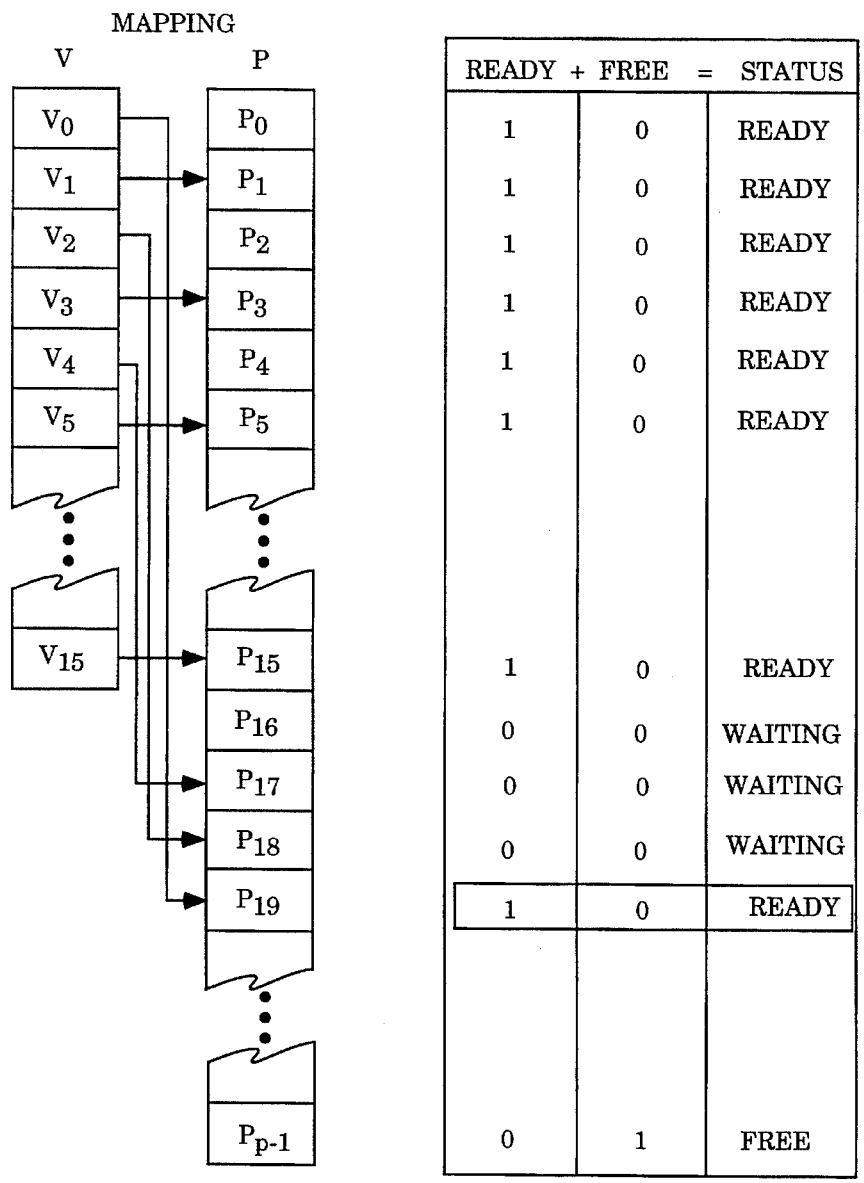
FIG. 11a illustrates the state of the map and the status of the physical register addresses when the fifth instruction in the instruction sequence completes out-of-order.
FIG. 11b illustrates the state of the FPQ when the fifth instruction in the instruction sequence completes out-of-order.

In the present example, the fpload operation completes out-of-order, as shown in FIG. 11b. Therefore the status value of physical register address $p_{18}$ is changed from WAITING to READY. This is illustrated in FIG. 11a. However, the instruction is not allowed to be retired or removed from the FPQ, as the older instructions of fpdiv, fpadd, fpstore and fpmul are still to be completed.

Figures 12A, 12B:
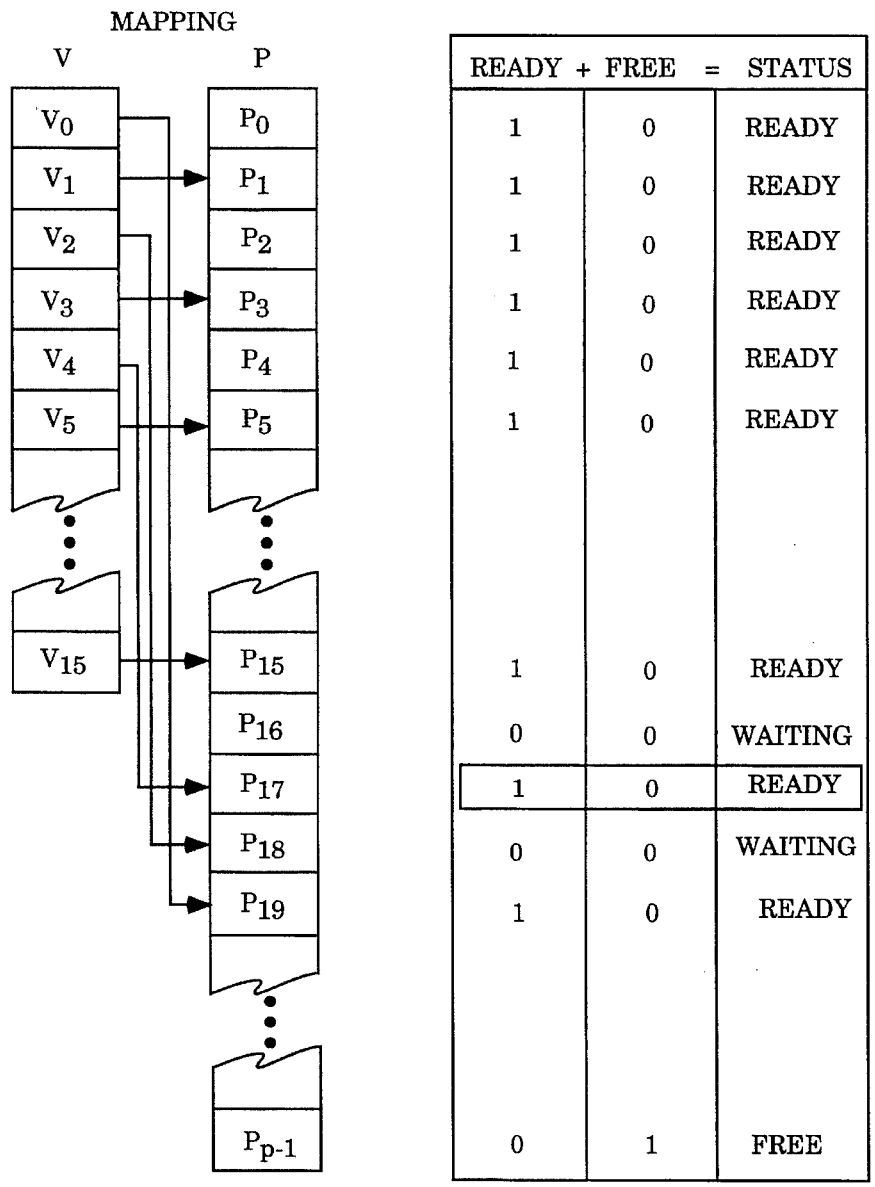
FIG. 12a illustrates the state of the map and the status of the physical register addresses when the second instruction in the instruction sequence completes out-of-order.
FIG. 12b illustrates the state of the FPQ when the second instruction in the instruction sequence completes out-of-order.

If the fpadd instruction then completes out-of-order, and the older fpdiv instruction is yet to be completed, the fpadd and fpload instructions are not removed from the FPQ. This is shown in FIG. 12b. However, because the fpadd instruction has completed, the status value of $p_{17}$ is set to READY. This is shown in FIG. 12a. Younger instructions such as fpstore that are dependent on the data in $p_{17}$ may be executed because the contents of register $p_{17}$ are available for use. In this implementation, however, execution of fpstore instructions is deferred until there are no older instructions still outstanding.

If the fpmul instruction generates an exception, the fpmul instruction and all instructions younger than the fpmul instruction are flushed from the FPQ. Flushing is done from the youngest to the oldest instruction. When an instruction is flushed, the mapping logic restores the map pointer of the virtual register address from the current destination register address to the old destination register address. Because no destination register address is allowed to be overwritten, the old destination register contains good data. If the instruction that generated the mapping of the old destination register is also flushed, the map pointer is changed to point to the old destination register of that instruction. This process continues until the mapping for each virtual register address corresponds to a mapping generated prior to excepted instruction. In an alternate embodiment, the excepted instruction remains in the FPQ and is visible to the exception handling process.

Figures 13A, 13B:
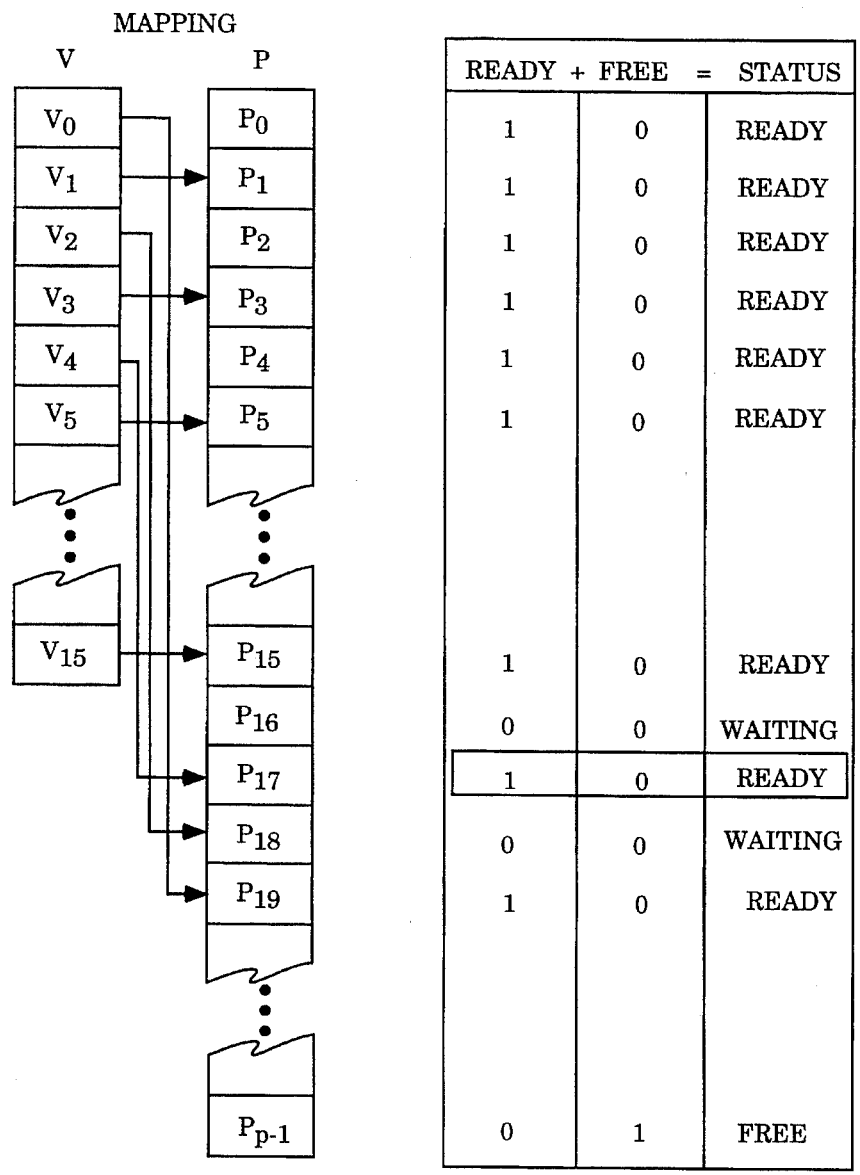
FIG. 13a illustrates the state of the map and the status of the physical register addresses when the unwinding of the instruction sequence begins in response to the fourth instruction resulting in an exception.
FIG. 13b illustrates the state of the FPQ when the unwinding of the instruction sequence begins in response to the fourth instruction resulting in an exception.
Figures 14A, 14B:
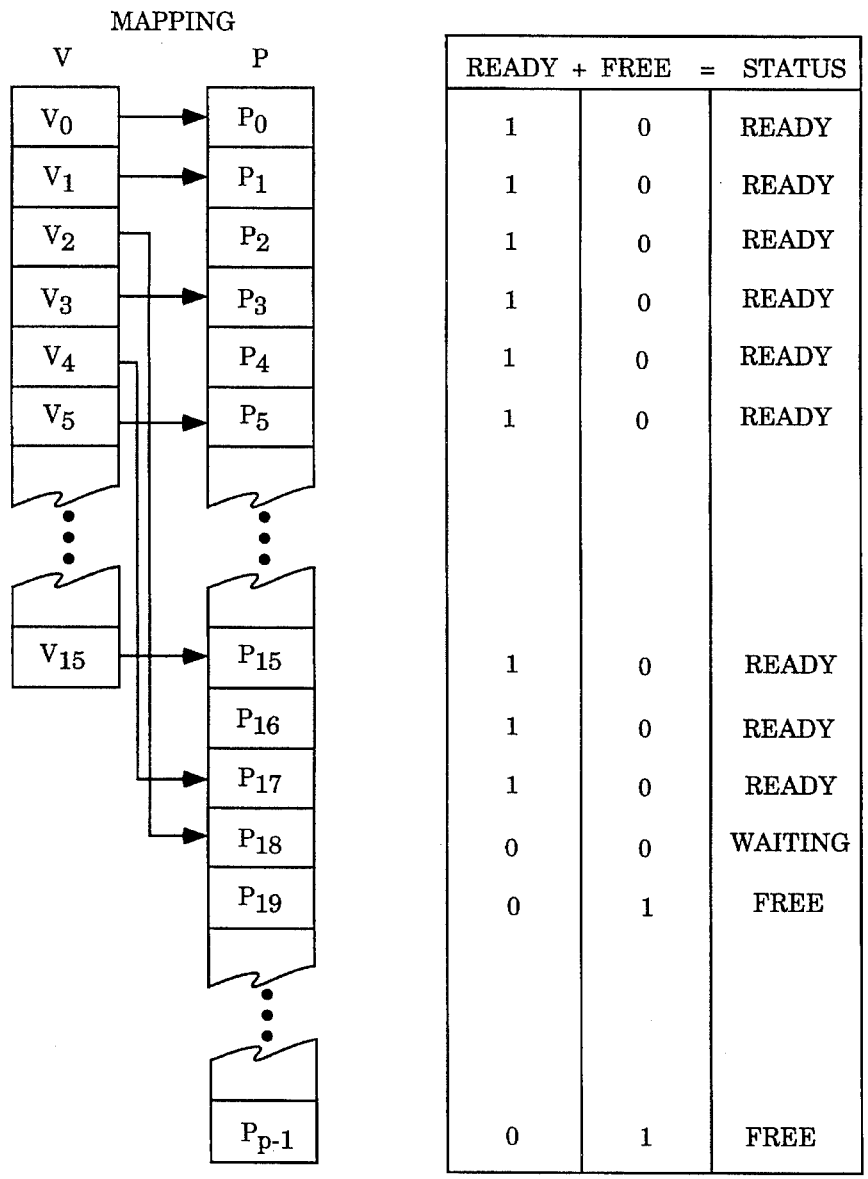
FIG. 14a illustrates the state of the map and the status of the physical register addresses as the unwinding of the instruction sequence continues.
FIG. 14b illustrates the state of the FPQ as the unwinding of the instruction sequence continues.

Thus, in the present example, the fpstore instruction is flushed first, as shown in FIG. 13b. No map pointer is changed because the fpstore instruction has no old destination register associated with it. This is illustrated in FIG. 13a. Then, the fpload instruction is flushed, as illustrated in FIG. 14b. This occurs even though the instruction has already completed. As a result of the flush, the status value of $p_{19}$ is set to FREE and $v_0$ is mapped to $p_0$, the old destination register address. This is illustrated in FIG. 14a. A comparison of FIG. 14b and FIG. 8b shows that the FPQ is returned to the state it had prior to the loading of the fpload instruction into the FPQ.

Figures 15A, 15B:
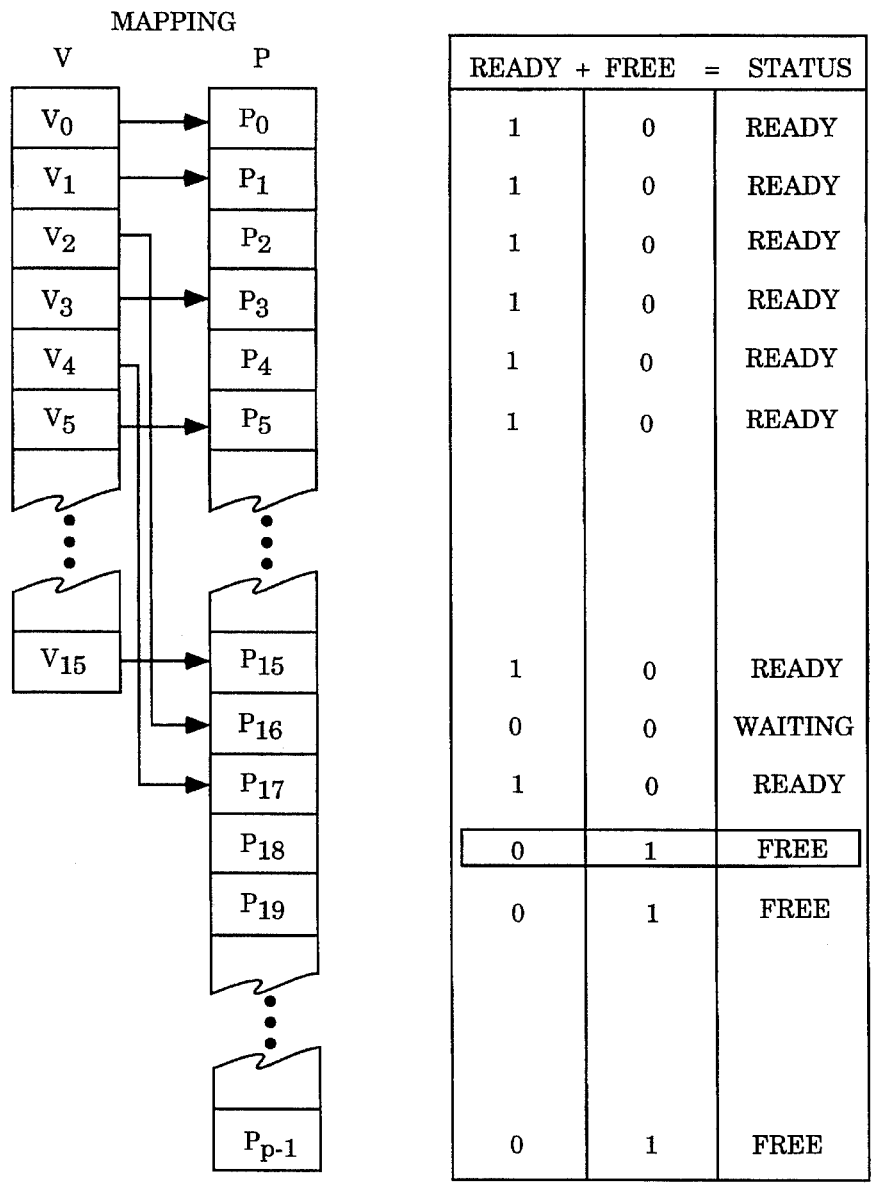
FIG. 15a illustrates the state of the map and the status of the physical register addresses when the unwinding of the instruction sequence ends.
FIG. 15b illustrates the state of the FPQ when the unwinding of the instruction sequence ends.

The unwinding process is completed when the fpmul instruction is flushed from the FPQ and the map pointer for virtual register address $v_2$ is changed from the destination register address P18 to the old destination register address $p_{16}$. This is illustrated in FIGS. 15a and 15b. It should be noted that the unwinding process may be done concurrently for all flushed instructions, rather than sequentially, as described above.

The unwinding process results in the state of the machine being restored to the state prior to the execution of the fpmul instruction, and precise exception handling is accomplished. This is true even if an instruction younger than the exception-producing instruction has written to a physical register in the register file because the status of the physical register addresses is reset to the status it had prior to the issuance of the exception-producing instruction. Exception processing begins at this point. Normal processing resumes when exception processing is complete.

Figures 16A, 16B:
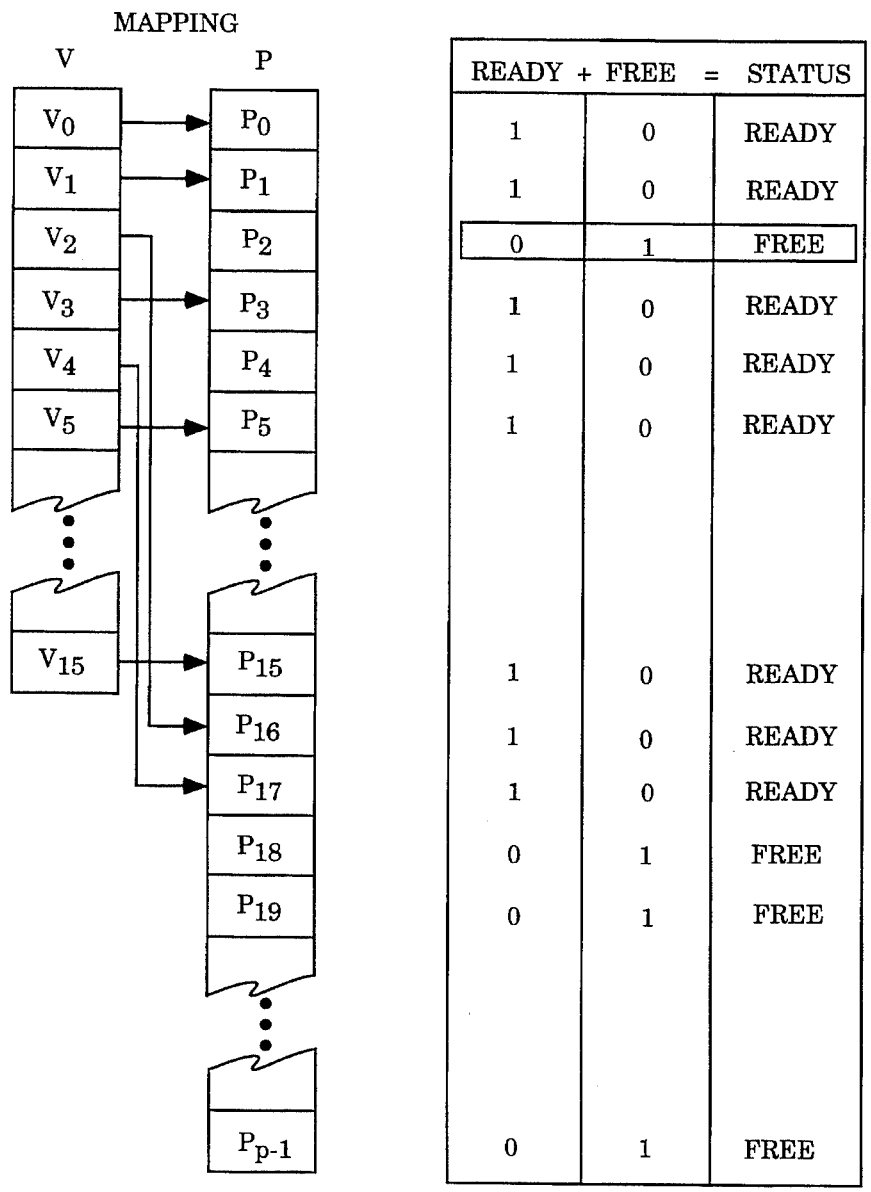
FIG. 16a illustrates the state of the map and the status of the physical register addresses when the first instruction in the instruction sequence completes and retires.
FIG. 16b illustrates the state of the FPQ when the first instruction in the instruction sequence completes and retires.
Figure 17A:
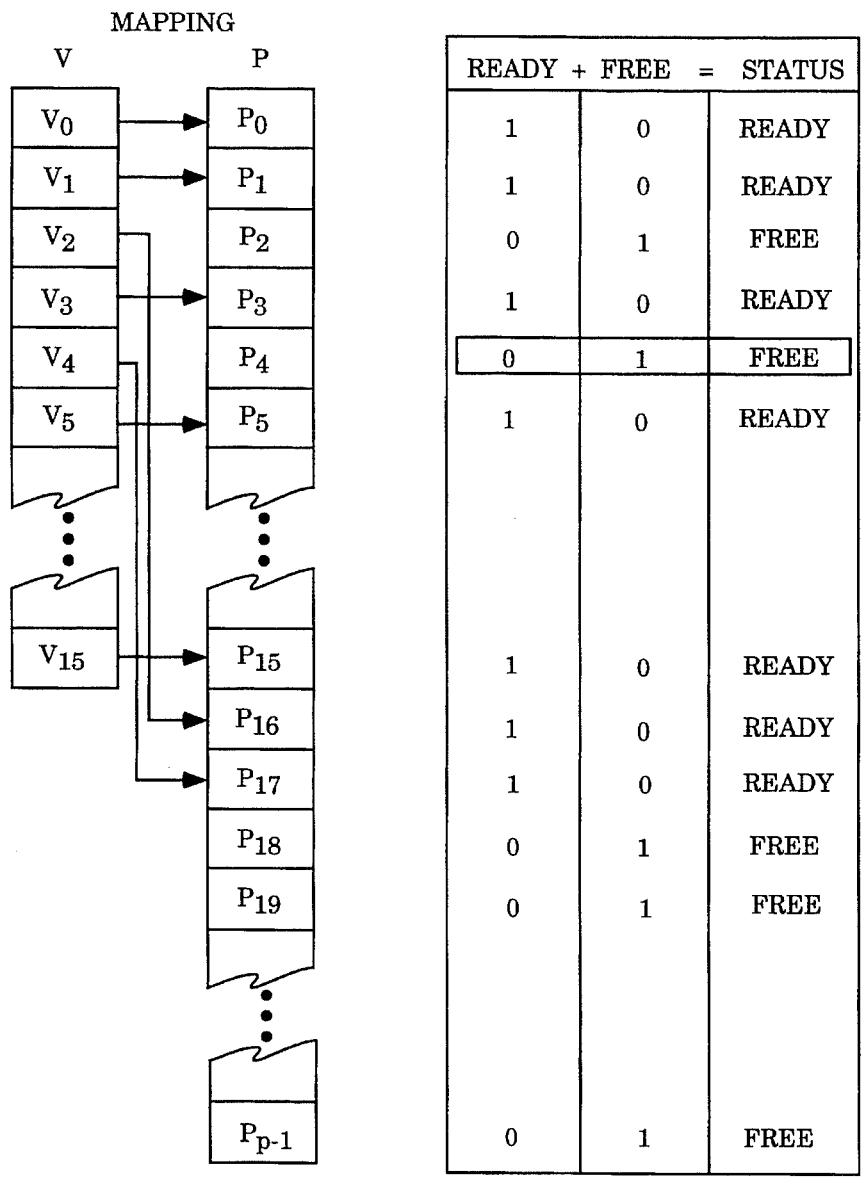
FIG. 17a illustrates the state of the map and the status of the physical register addresses when the second instruction in the instruction sequence retires.
Figure 17B:
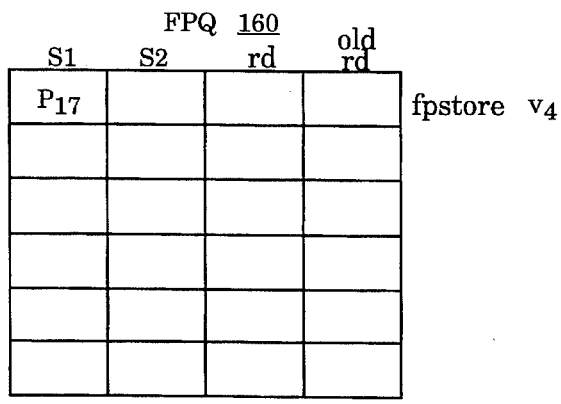
FIG. 17b illustrates the state of the FPQ when the second instruction in the instruction sequence retires.
Figures 18A, 18B:
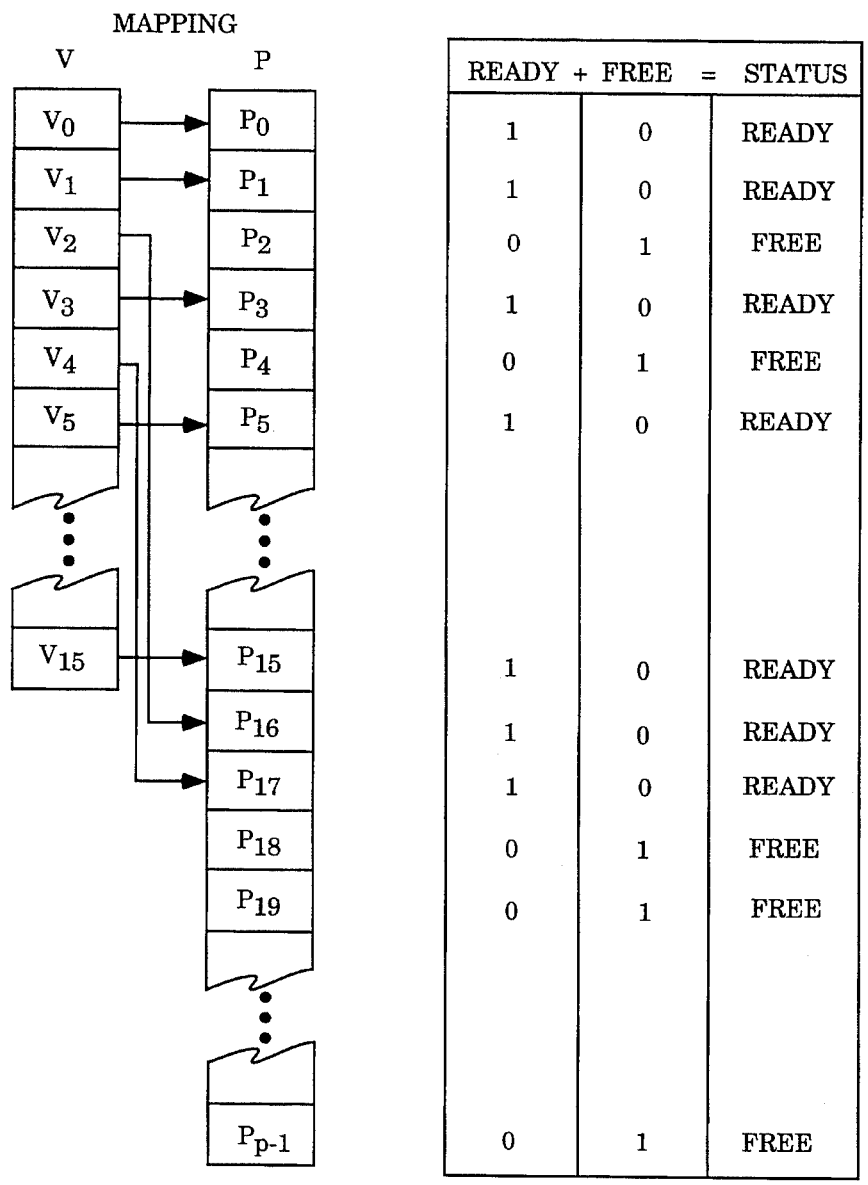
FIG. 18a illustrates the state of the map and the status of the physical register addresses when the third instruction in the instruction sequence completes and retires.
FIG. 18b illustrates the state of the FPQ when the third instruction in the instruction sequence completes and retires.

When the fpdiv instruction subsequently completes, the instruction also retires because it is the oldest outstanding instruction. The fpdiv instruction is removed from the FPQ as seen in FIG. 16b. Therefore, the status value of the old destination register $p_2$ is set to FREE, and the status value of the destination register $p_{16}$ is set to READY. This is illustrated in FIG. 16a. The fpadd instruction that has completed is removed from the FPQ. This is illustrated in FIG. 17b. The status value of $p_4$ is set to FREE, as illustrated in FIG. 17a. The fpstore instruction is then executed and subsequently removed from the FPQ. This is illustrated in FIGS. 18a and 18b.

Note that if the fpdiv instruction had resulted in an exception, the entire instruction sequence would have been flushed and the initial map and status values would have been reset to initial values. Also note that the number of mapped and unmapped physical register addresses when the instruction sequence is completed is the same number as the initial mapping.

Figure 19:
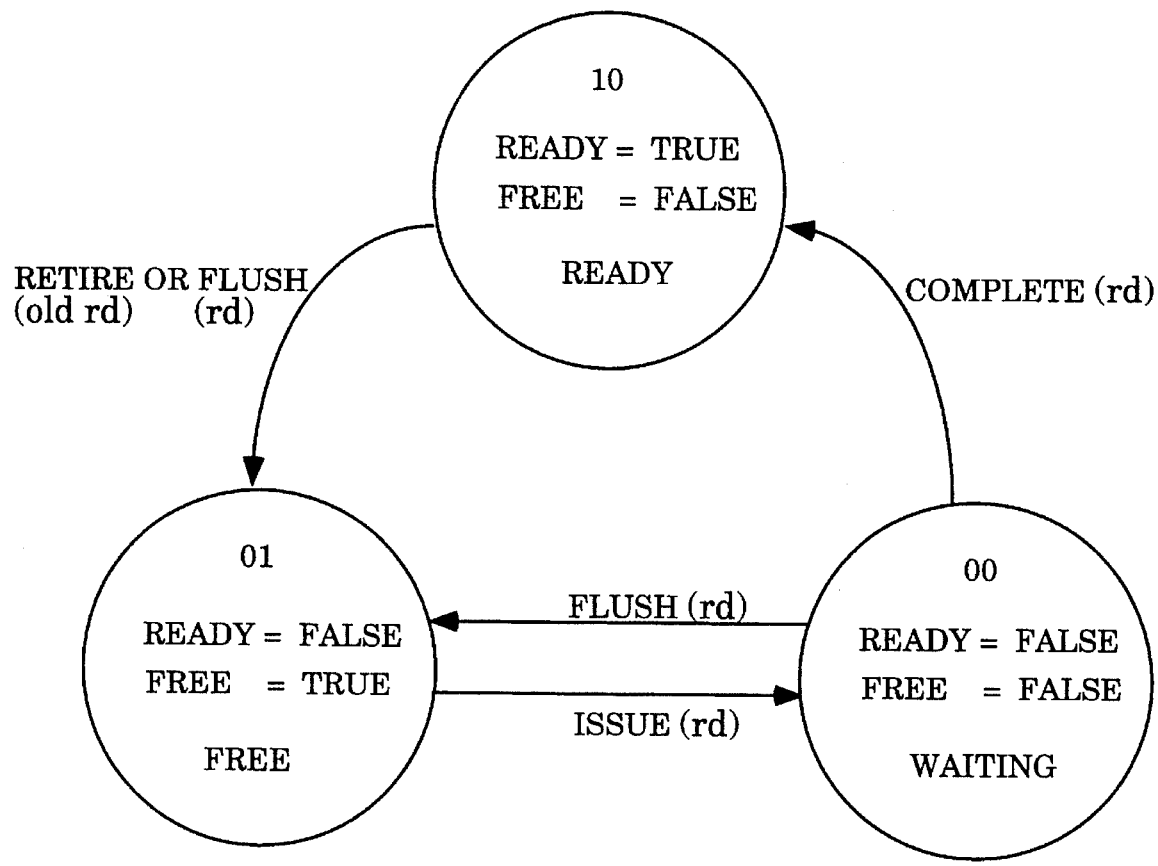
FIG. 19 is a state diagram of an exemplary algorithm implemented by the state machine in one embodiment.

FIG. 19 is a state diagram illustrating an exemplary algorithm implemented by the status state machine in the mapping logic 150. In this embodiment, the algorithm requires two status bits per physical register address: a first bit to indicate a ready status and a second bit to indicate a FREE status. When an initial mapping is instituted all mapped physical register addresses have a READY status corresponding to a true ready bit and a false free bit. All unmapped physical register addresses are assigned a FREE status corresponding to a false ready bit and a true free bit.

The initial status bits are changed when new instructions are issued, when current instructions complete, and when old instructions retire. Only FREE physical register addresses may be assigned as a new map value for a destination register. When an instruction is issued the mapped physical destination register has its status value set to WAITING, which corresponds to a false status for each bit. When an instruction completes, the mapped physical destination register has its status value set to READY. If an instruction produces an exception, it and all younger instructions have the status values of the destination registers set to FREE, regardless of whether the younger instruction had previously completed, and the instruction is canceled if execution has started.

The READY state resolves data dependencies. When an instruction is completed, all younger instructions that depend on the result may then be dispatched. The FREE state signifies that the physical register addresses having that status are available for mapping, and the WAITING state signifies that an instruction is pending and the result in the destination register may not be used until it is READY.

While the method and apparatus of the present invention have been described in terms of its presently preferred and alternate embodiments, those skilled in the art will recognize that the present invention may be practiced with modification and alteration without departing from the spirit and scope of the invention. The specifications and drawings are, accordingly, to be regarded in an illustrative rather than a restrictive sense.

What is claimed is:

1. A method, comprising the steps of:

providing a plurality of virtual register addresses;

providing a plurality of physical register addresses;

providing a map that maintains a mapping between each of the plurality of virtual register addresses and a corresponding one of a subset of the plurality of physical register addresses;

dispatching a sequence of instructions;

generating a sequence of mapped instructions in response to receiving the sequence of instructions, wherein the step of generating a sequence of mapped instructions comprises:

generating a new mapping for a particular virtual register address whenever that virtual register address is specified as a destination register address by one of the sequence of instructions; and generating a mapped instruction using the new mapping, the mapped instruction including the new mapping and a previous mapping of the particular virtual register address;

executing the sequence of mapped instructions such that younger mapped instructions occurring later in a program order are allowed to complete execution before older mapped instructions occurring earlier in the program order complete; and storing a result for each mapped instruction that successfully completes execution, the result being stored at the physical register address indicated by the new mapping of that mapped instruction.

2. The method of claim 1 where in a first mapped instruction of the sequence of mapped instructions results in an exception, the method further comprising the step of:

resetting the map to a previous mapping of the first mapped instruction using the previous mapping contained in the first mapped instruction.

3. The method according to claim 2 wherein previous mappings for all of the virtual register addresses are generated by an initial mapping step wherein each virtual register address is initially mapped to a physical register address prior to the sequence of instructions being issued.

4. The method according to claim 2 wherein the step of resetting comprises unwinding the sequence of mapped instructions from a youngest instruction to an oldest instruction.

5. The method according to claim 4 wherein mapped instructions are unwound even if completed.

6. The method according to claim 5 wherein the unwinding is performed sequentially.

7. The method according to claim 5 wherein the unwinding is performed in parrallel.

8. A processor comprising:

an instruction dispatch unit for dispatching a sequence of instructions, each instruction in the sequence of instructions specifying at least one virtual register address, each virtual register address corresponding to one of a plurality of virtual registers;

a register file comprising a plurality of physical registers wherein each physical register is indicated by a physical register address;

a mapping unit coupled to the instruction dispatch unit and the register file, the mapping unit including a map that maintains a mapping between each virtual register address and a corresponding one of a subset of the plurality of physical register addresses, the mapping unit for generating a sequence of mapped instructions in response to receiving the sequence of instructions wherein at least one mapped instruction includes a new mapping and a previous mapping of a particular virtual register address, the mapping unit generating the new mapping for the particular virtual register when a corresponding one of the sequence of instructions specifies the particular virtual register as its destination address register; and an instruction execution unit coupled to the mapping unit and the register file, the instruction execution unit for executing the sequence of mapped instructions such that younger instructions that occur later in the instruction sequence are allowed to complete before older instructions that occur earlier in the instruction sequence complete, the instruction execution unit for writing a result for each mapped instruction to the register file.

9. The processor of claim 8, wherein the instruction dispatch unit has output a first instruction, the processor further comprising:

map resetting device for resetting the map to its previous state prior to dispatch of the first instruction if the first instruction results in an exception.

10. The processor according to claim 9, the map resetting device further for resetting to the previous state by unwinding the sequence of instructions from a youngest instruction to the first instruction.

11. The processor according to claim 10, the map resetting device further for unwinding the sequence of instructions even if a second instruction younger than the first instruction is completed.

12. The method according to claim 11, the map resetting device further for unwinding the sequence of instructions sequentially.

13. The method according to claim 11, the map resetting device further for unwinding the sequence of instruction in parallel.

14. A computer system comprising:

a memory; and a processor coupled to the memory, the processor further comprising:

an instruction dispatch unit for dispatching a sequence of instructions, each instruction in the sequence of instructions specifying at least one virtual register address, each virtual register address corresponding to one of a plurality of virtual registers;

a register file comprising a plurality of physical registers wherein each physical register is indicated by a physical register address;

a mapping unit coupled to the instruction dispatch unit and the register file, the mapping unit including a map that maintain a mapping between each virtual register address and a corresponding one of a subset of the plurality of physical register addresses, the mapping unit for generating a sequence of mapped instructions in response to receiving the sequence of instructions wherein at least one mapped instruction includes a new mapping and a previous mapping of a particular virtual register address, the mapping unit generating the new mapping for the particular virtual register when a corresponding one of the sequence of instructions specifies the particular virtual register as its destination address register; and an instruction execution unit coupled to the mapping unit and the register file, the instruction execution unit for executing the sequence of mapped instructions such that younger instructions that occur later in the instruction sequence are allowed to complete before older instructions that occur earlier in the instruction sequence complete, the instruction execution unit for writing a result for each mapped instruction to the register file.

15. The computer system of claim 14, wherein the instruction dispatch unit has output a first instruction, the computer system further comprising:

dispatcher for dispatching a first instruction; and map resetting device for resetting the map to its previous state prior to the dispatch of the first instruction if the first instruction results in an exception.

16. The computer system according to claim 14, the map resetting device further for resetting to the previous state by unwinding the sequence of instructions from a youngest instruction to the first instruction.

17. The computer system according to claim 16, the map resetting device further for unwinding the sequence of instructions even if a second instruction younger than the first instruction is completed.

18. The computer system according to claim 17, the map resetting device further for unwinding the sequence of instructions sequentially.

19. The computer system according to claim 17, the map resetting device further for unwinding the sequence of instruction in parallel.

20. A method for providing out-of-order execution of instructions comprising the steps of:

maintaining a mapping between each of a plurality of virtual register addresses and corresponding ones of a subset of a plurality of physical register addresses;

issuing a sequence of instructions wherein each of the sequence of instructions is of a specified type and wherein at least one of the sequence of instructions specifies one of the plurality of virtual register addresses as a destination for results;

generating new mappings for ones of the plurality of virtual register addresses whenever virtual register addresses are specified as destinations for ones of the plurality of instructions;

generating a sequence of mapped instructions in response to the sequence of instructions wherein each mapped instruction includes a destination register address field for containing a physical register address specified by a new mapping and an old destination register address field for containing a physical register address specified by a previous mapping;

storing the sequence of mapped instructions in a queue; and executing the sequence of mapped instructions such that younger mapped instructions occurring later in a program order are allowed to complete execution before older mapped instructions occurring later in the program order have completed.

21. The method of claim 20 further comprising the steps of:

storing a result for each mapped instruction that successfully completes execution at the physical register address specified by the destination register address field of that mapped instruction, if any; and removing a particular mapped instruction from the queue when the particular mapped instruction has completed if all older mapped instructions have completed.

22. The method according to claim 21 wherein a first mapped instruction causes an exception, the method further comprising the step of:

flushing the first mapped instruction and all mapped instructions that are younger than the first mapped instruction from the queue.

23. The method according to claim 22, the step of flushing the queue comprising the step of:

unwinding the sequence of mapped instructions from a youngest mapped instruction to the first mapped instruction that caused the exception to reset the mapping between the virtual register addresses and the physical register addresses to the mapping as it existed before the first mapped instruction was generated, the step of unwinding the sequence of mapped instruction comprising the steps of:

checking the old destination register address field of each mapped instruction; and resetting the mapping of a particular virtual register address to point to a particular physical register address specified by the old destination register address if the old destination register address field contains "the particular physical register address".

24. A method comprising the steps of:

providing a map that maintains a mapping between each of a plurality of virtual register addresses and a corresponding one of a subset of a plurality of physical register addresses, wherein a new mapping is provided for a particular virtual register address whenever the particular virtual register address is specified as a destination for a result of an instruction;

dispatching a sequence of instructions that include arithmetic instructions that specify virtual register addresses as destinations for results;

generating a sequence of mapped instructions including mapped arithmetic instructions in response to receiving the sequence of instructions, wherein each mapped arithmetic instruction includes a destination register address that specifies a first physical register address indicated by a new mapping of a corresponding virtual register address and an old destination register address that specifies a second physical register address indicated by a previous mapping of the corresponding virtual register address.

25. The method of claim 24 further comprising the steps of:

executing the sequence of mapped instructions out of sequential order;

resetting the map if a first mapped instruction causes an exception by using previous mappings of the first mapped instruction and mapped instructions that occur later in the sequence of mapped instructions such that each of the mappings for the plurality of virtual register addresses has a state that existed prior to generating the first mapped instruction.

* * * * *

UNITED STATES PATENT AND TRADEMARK OFFICE
CERTIFICATE OF CORRECTION

PATENT NO. : 5,546,554
DATED : August 13, 1996
INVENTOR(S) : Yung et al.

It is certified that error appears in the above-identified patent and that said Letters Patent is hereby corrected as shown below:

In column 4 at line 7, please delete " SPARC™ " and insert -- SPARC™ V8 --.

In column 15, claim 14 at line 47, please delete " maintain " and insert -- maintains --.

Signed and Sealed this

Fourteenth Day of January, 1997

Attest:

BRUCE LEHMAN

*Attesting Officer*  *Commissioner of Patents and Trademarks*